US010318895B1

(12) United States Patent
Norwood et al.

(10) Patent No.: US 10,318,895 B1
(45) Date of Patent: Jun. 11, 2019

(54) SYSTEM FOR PROMOTING EFFICIENT USE OF RESOURCES

(71) Applicant: Curb Inc., Austin, TX (US)

(72) Inventors: Erik Norwood, Austin, TX (US); Giuseppe Giordano, Austin, TX (US); John C. Shore, Austin, TX (US); Brandon Hudgeons, Austin, TX (US)

(73) Assignee: Curb, Inc., Austin, TX (US)

( * ) Notice: Subject to any disclaimer, the term of this patent is extended or adjusted under 35 U.S.C. 154(b) by 569 days.

(21) Appl. No.: 14/469,651

(22) Filed: Aug. 27, 2014

Related U.S. Application Data

(60) Provisional application No. 61/870,750, filed on Aug. 27, 2013.

(51) Int. Cl.
G06Q 10/06 (2012.01)
G06Q 50/06 (2012.01)
(52) U.S. Cl.
CPC ......... G06Q 10/0631 (2013.01); G06Q 50/06 (2013.01)
(58) Field of Classification Search
CPC ......... G06Q 10/00; G06Q 40/00; G06F 17/60
USPC ...................................................... 705/7.12
See application file for complete search history.

(56) References Cited

U.S. PATENT DOCUMENTS 5,566,084 A   10/1996  Cmar
6,088,688 A *  7/2000  Crooks ................. G06Q 10/06
                                                  702/61
6,122,603 A    9/2000  Budike, Jr.
6,366,889 B1*  4/2002  Zaloom ................ G06Q 10/04
                                                  705/400
6,587,754 B2   7/2003  Hung et al.
6,684,193 B1*  1/2004  Chavez ................. G06Q 10/04
                                                  705/7.25
6,937,946 B1   8/2005  Culp et al.
6,956,500 B1  10/2005  Ducharme et al.
(Continued)

FOREIGN PATENT DOCUMENTS

EP    1984858 A2   10/2008
EP    2033060 A2    3/2009
(Continued)

OTHER PUBLICATIONS

"PowerWise Products: The eMonitor and more", webpage, PowerWise Systems, 4 pages, Jun. 20, 2013, Blue Hill, Maine, US.
(Continued)

Primary Examiner — Romain Jeanty
(74) Attorney, Agent, or Firm — Meyertons, Hood, Kivlin, Kowert & Goetzel, P.C.

(57) ABSTRACT

A method of promoting more efficient use of a resource includes acquiring values associated with consumption of a resource by an entity at a place (for example, a building, a floor, or a wing of a building). A normalization of the values may be performed. While the resource is being consumed at the place, comparisons based on the normalized values associated with consumption of the resource at the place and one or more other values associated with consumption of the resource are displayed to one or more persons of the entity. In some cases, consumption of the entity is compared with consumption by one or more other entities (for example, in a graph comparing one company's consumption for the week with that of another company.)

19 Claims, 14 Drawing Sheets

(56) References Cited

U.S. PATENT DOCUMENTS

| | | |
|---|---|---|
| 6,996,508 B1 | 2/2006 | Culp et al. |
| 7,089,089 B2 | 8/2006 | Cumming et al. |
| 7,120,610 B1 * | 10/2006 | Brookner .......... G06Q 50/32 |
| | | 705/401 |
| 7,127,328 B2 | 10/2006 | Ransom |
| 7,130,719 B2 | 10/2006 | Ehlers et al. |
| 7,188,003 B2 | 3/2007 | Ransom et al. |
| 7,225,089 B2 | 5/2007 | Culp et al. |
| 7,246,014 B2 | 7/2007 | Forth et al. |
| 7,343,226 B2 | 3/2008 | Ehlers et al. |
| 7,373,221 B2 | 5/2008 | Lal |
| 7,379,997 B2 | 5/2008 | Ehlers et al. |
| 7,409,303 B2 | 8/2008 | Yeo et al. |
| 7,418,428 B2 | 8/2008 | Ehlers et al. |
| 7,516,106 B2 | 4/2009 | Ehlers et al. |
| 7,541,941 B2 * | 6/2009 | Bogolea ............ G01D 4/004 |
| | | 340/870.02 |
| 7,552,033 B1 | 6/2009 | Culp et al. |
| 7,693,670 B2 | 4/2010 | Durling et al. |
| 7,761,910 B2 | 7/2010 | Ransom et al. |
| 7,766,231 B2 | 8/2010 | Oldham et al. |
| 7,885,917 B2 | 2/2011 | Kuhns et al. |
| 7,949,615 B2 | 5/2011 | Ehlers et al. |
| 7,979,239 B2 | 7/2011 | Trias |
| 8,063,775 B2 | 11/2011 | Reed et al. |
| 8,131,401 B2 | 3/2012 | Nasle |
| 8,155,908 B2 | 4/2012 | Nasle et al. |
| 8,160,752 B2 | 4/2012 | Weaver et al. |
| 8,200,370 B2 | 6/2012 | Paik |
| 8,229,722 B2 | 7/2012 | Nasle |
| 8,255,554 B2 | 8/2012 | Andrade et al. |
| 8,286,191 B2 | 10/2012 | Amini et al. |
| 8,326,713 B2 * | 12/2012 | Deliwala ............ G06Q 30/04 |
| | | 705/32 |
| 8,326,793 B1 | 12/2012 | Bowers et al. |
| 8,355,827 B2 | 1/2013 | Egnor et al. |
| 8,359,389 B1 * | 1/2013 | Cohen ............... H04W 4/20 |
| | | 705/23 |
| 8,370,283 B2 | 2/2013 | Pitcher et al. |
| 8,374,725 B1 | 2/2013 | Ols |
| 8,396,821 B2 | 3/2013 | Kuhns et al. |
| 8,412,147 B2 | 4/2013 | Hunter et al. |
| 8,447,541 B2 | 5/2013 | Rada et al. |
| 8,461,725 B1 | 6/2013 | Stubbs et al. |
| 8,521,336 B2 | 8/2013 | Paik |
| 8,527,223 B2 | 9/2013 | AbuAli et al. |
| 8,538,484 B2 | 9/2013 | Chan et al. |
| 8,560,134 B1 | 10/2013 | Lee |
| 8,577,661 B2 | 11/2013 | Nasle |
| 8,606,686 B1 | 12/2013 | Ippolito et al. |
| 8,620,841 B1 | 12/2013 | Filson et al. |
| 8,660,868 B2 | 2/2014 | Vogel et al. |
| 8,676,953 B2 | 3/2014 | Koch |
| 8,706,308 B2 | 4/2014 | Reichmuth et al. |
| 8,719,184 B2 * | 5/2014 | Buchanan .......... G06Q 10/06 |
| | | 705/412 |
| 8,719,186 B2 | 5/2014 | Amram et al. |
| 8,751,427 B1 | 6/2014 | Mysen et al. |
| 8,761,944 B2 | 6/2014 | Drew et al. |
| 8,825,671 B1 | 9/2014 | Nordstrom |
| 8,832,003 B1 | 9/2014 | Bowers et al. |
| 8,850,348 B2 | 9/2014 | Fadell et al. |
| 8,886,625 B1 | 11/2014 | Dorner et al. |
| 8,893,032 B2 | 11/2014 | Bruck et al. |
| 8,909,358 B2 | 12/2014 | Kamouskos |
| 8,920,619 B2 | 12/2014 | Salzer et al. |
| 8,924,550 B2 | 12/2014 | Cohen et al. |
| 8,935,393 B1 | 1/2015 | Jackson et al. |
| 8,947,437 B2 | 2/2015 | Garr et al. |
| 8,958,917 B2 | 2/2015 | Wolfe et al. |
| 8,959,006 B2 | 2/2015 | Nasle |
| 8,983,670 B2 | 3/2015 | Shetty et al. |
| 9,009,192 B1 | 4/2015 | Shmiel et al. |
| 9,014,996 B2 | 4/2015 | Kamel et al. |
| 9,015,003 B2 | 4/2015 | Wolfe |
| 9,031,824 B2 | 5/2015 | Nasle |
| 9,032,316 B1 | 5/2015 | Nordstrom et al. |
| 9,056,783 B2 | 6/2015 | Wolfe |
| 9,057,746 B1 | 6/2015 | Houlette et al. |
| 2004/0140908 A1 | 7/2004 | Gladwin et al. |
| 2005/0021580 A1 | 1/2005 | Swanson |
| 2005/0125701 A1 | 6/2005 | Hensbergen et al. |
| 2007/0043477 A1 | 2/2007 | Ehlers et al. |
| 2007/0043478 A1 | 2/2007 | Ehlers et al. |
| 2009/0045976 A1 | 2/2009 | Zoldi et al. |
| 2009/0069861 A1 | 3/2009 | Gandhi et al. |
| 2009/0157529 A1 | 6/2009 | Ehlers et al. |
| 2010/0094475 A1 | 4/2010 | Masters et al. |
| 2010/0106575 A1 | 4/2010 | Bixby et al. |
| 2010/0174419 A1 | 7/2010 | Brumfield et al. |
| 2010/0191487 A1 | 7/2010 | Rada et al. |
| 2010/0211509 A1 | 8/2010 | Jacobs |
| 2010/0250015 A1 | 9/2010 | Flikkema |
| 2010/0250440 A1 | 9/2010 | Wang et al. |
| 2010/0262313 A1 | 10/2010 | Chambers et al. |
| 2010/0289643 A1 | 11/2010 | Trundle et al. |
| 2011/0022242 A1 | 1/2011 | Bukhin et al. |
| 2011/0040785 A1 | 2/2011 | Steenberg et al. |
| 2011/0109472 A1 | 5/2011 | Spirakis et al. |
| 2011/0119199 A1 * | 5/2011 | Waibel ............... G06Q 10/00 |
| | | 705/317 |
| 2011/0161250 A1 | 6/2011 | Koeppel et al. |
| 2011/0207995 A1 | 8/2011 | Snow et al. |
| 2011/0264563 A1 * | 10/2011 | Lundberg ........... G06Q 30/02 |
| | | 705/27.2 |
| 2011/0282506 A1 | 11/2011 | Amram et al. |
| 2011/0289019 A1 | 11/2011 | Radloff et al. |
| 2012/0031984 A1 | 2/2012 | Feldmeier et al. |
| 2012/0066397 A1 | 3/2012 | Koch et al. |
| 2012/0089269 A1 | 4/2012 | Weaver et al. |
| 2012/0101653 A1 | 4/2012 | Tran |
| 2012/0221162 A1 | 8/2012 | Forbes, Jr. |
| 2012/0271472 A1 | 10/2012 | Brunner et al. |
| 2012/0316808 A1 | 12/2012 | Frader-Thompson et al. |
| 2013/0046703 A1 | 2/2013 | Ambati et al. |
| 2013/0055132 A1 | 2/2013 | Foslien |
| 2013/0066479 A1 | 3/2013 | Shetty et al. |
| 2013/0073102 A1 * | 3/2013 | Bischof ............. G06Q 10/04 |
| | | 700/291 |
| 2013/0144451 A1 | 6/2013 | Kumar et al. |
| 2013/0268325 A1 * | 10/2013 | Dembo ............. G06T 11/206 |
| | | 705/7.39 |
| 2014/0074730 A1 | 3/2014 | Arensmeier et al. |
| 2014/0129160 A1 | 5/2014 | Tran |
| 2014/0195397 A1 | 7/2014 | Ippolito et al. |
| 2014/0207708 A1 | 7/2014 | Amram et al. |
| 2014/0277761 A1 | 9/2014 | Matsuoka et al. |
| 2014/0277769 A1 | 9/2014 | Matsuoka et al. |
| 2014/0277795 A1 | 9/2014 | Matsuoka et al. |
| 2014/0336960 A1 | 11/2014 | Haghighat-Kashani et al. |
| 2014/0371921 A1 | 12/2014 | Weaver et al. |
| 2014/0371922 A1 | 12/2014 | Weaver et al. |
| 2014/0371937 A1 | 12/2014 | Weaver et al. |
| 2014/0371939 A1 | 12/2014 | Weaver et al. |
| 2015/0048679 A1 | 2/2015 | Kotowski et al. |
| 2015/0051749 A1 | 2/2015 | Hancock et al. |
| 2015/0058064 A1 | 2/2015 | Weaver et al. |
| 2015/0066221 A1 | 3/2015 | Weaver et al. |

FOREIGN PATENT DOCUMENTS

| | | | |
|---|---|---|---|
| EP | 2663955 A2 | 11/2013 | |
| EP | 2746886 A2 | 6/2014 | |
| WO | 2007095585 A2 | 8/2007 | |
| WO | 2008003033 A2 | 1/2008 | |
| WO | 2009020684 A1 | 2/2009 | |
| WO | WO 2011101476 A1 * | 8/2011 | ............ G05B 15/02 |
| WO | 2012031163 A1 | 3/2012 | |
| WO | 2012095870 A2 | 7/2012 | |
| WO | 2012099588 A1 | 7/2012 | |

(56) References Cited

FOREIGN PATENT DOCUMENTS

| WO | 2012103244 A2 | 8/2012 |
|----|---------------|--------|
| WO | 2013106923 A1 | 7/2013 |
| WO | 2014164976 A1 | 10/2014 |

OTHER PUBLICATIONS

"Building Monitoring and Energy Management", webpage, PowerWise Systems, 6 pages, Jun. 20, 2013, Blue Hill, Maine, US.
Norwood et al., U.S. Appl. No. 14/944,118, filed Nov. 17, 2015.
International Search Report, Application No. PCT/US15/61178, dated Apr. 8, 2016, 21 pages.
International Search Report, Application No. PCT/US2015/061179, dated Mar. 25, 2016, 32 pages.
Non-Final Office Action, U.S. Appl. No. 14/944,118, dated Aug. 16, 2016, 22 pages.
Final Office Action, U.S. Appl. No. 14/944,118, dated Jun. 2, 2017, 15 pages.
Interview Summary, U.S. Appl. No. 14/944,118, dated Oct. 17, 2017, 5 pages.
Advisory Action, U.S. Appl. No. 14/944,118, dated Nov. 27, 2017, 3 pages.
Office Action, U.S. Appl. No. 14/944,118, dated Dec. 28, 2017, 15 pages.

\* cited by examiner

SYSTEM FOR PROMOTING EFFICIENT USE OF RESOURCES

PRIORITY CLAIM

This application claims priority to U.S. Provisional Application Ser. No. 61/870,750 entitled "SYSTEM FOR PROMOTING EFFICIENT USE OF RESOURCES" filed Aug. 27, 2013, which is incorporated herein by reference in its entirety.

BACKGROUND

Field

The present invention relates to the management and use of resources, such as energy. More particularly, the present invention relates to systems and methods to reduce consumption of electricity and other resources (such as water, natural gas and air) by occupants of commercial, industrial, residential or other buildings.

Description of the Related Art

Every year, occupants of commercial properties and public sector buildings consume far more electricity than is actually required. Billions of dollars are wasted. Some efforts have been made to curtail this waste through energy management systems, automated temperature and lighting controls, and even basic infrastructure replacement with efficiency upgrades. Nevertheless, these efforts have been only partly successful in eliminating waste.

Enterprise office and industrial buildings, public sector facilities, and other commercial properties have a higher plug load today than several decades ago. Individuals are consuming a higher percentage of a building's energy than years past. Some of the energy waste in commercial properties could be reduced by actions and choices of the occupants in the building (for example, an office worker turning off the lights as the office worker leaves the office at the end of the work day). In any given environment, however, individuals may have neither sufficient information nor sufficient motivation to reduce consumption in a significant way.

SUMMARY

Systems and methods for promoting efficient use of resources are described. In an embodiment, a method of promoting more efficient use of a resource includes acquiring values associated with consumption of a resource by an entity (for example, a group of people occupying an office building) at a place (for example, a floor the building). A normalization of the values may be performed. While the resource is being consumed at the place, comparisons based on the normalized values associated with consumption of the resource at the place and one or more other values associated with consumption of the resource are displayed to one or more persons of the entity. In some cases, the entity is an individual person and the comparisons are displayed to that person.

In some cases, consumption of the entity is compared with consumption by one or more other entities (for example, in a graph comparing one office building's power consumption for the week with power consumption of another office building.) The consumption information may be used to conduct games or contests between entities to promote more efficient consumption of the resources. For example, occupants of different buildings can compete with one another to reduce consumption of electricity.

In an embodiment, a method of promoting more efficient use of a resource includes acquiring values associated with consumption of a resource by an entity. Based on the values acquired, one or more goals for more efficient consumption of the resource by the entity are determined. The goals are displayed to a person in the entity. One or more indicators of progress by the entity toward the goals may be displayed.

In an embodiment, a method of promoting more efficient use of a resource includes acquiring values associated with consumption of a resource by an entity. While the resource is being consumed by the entity, a radial graph reflecting resource consumption is displayed. The radial graph includes consumption level indicators that appear sequentially around a circle. The consumption level indicator bars may indicate a level of consumption of the resource at successive periods in time.

In an embodiment, a method of promoting more efficient use of a resource includes acquiring values associated with consumption of a resource by an entity. While the resource is being consumed by the entity, a dynamic indicator is displayed indicating resource consumption. The dynamic indicator may include characteristics that are analogous to a human physiological indicator, such as a heartbeat. The rate of consumption of the resource may correspond to the human physiological indicator.

In an embodiment, a method of promoting more efficient use of a resource includes receiving, from each of two or more entities consuming a resource (for example, two or more persons in an office building), an input signal to control or influence use of the resource. Based on the input signal for at least one of the entities, one or more offsetting measure options are identified. The offsetting measure options are actions that the entity could take that would offset at least a portion of the consumption of the resource by the entity. The offsetting measure options are displayed to the entity. For example, when an individual wants to consume more energy by heating the building, the system may present the individual with ways to offset this consumption, such as turning off the overhead lights for a specific amount of time.

In an embodiment, a method of reducing ecological impact by an entity at a place includes acquiring values associated with ecological impact of actions by an entity at the place. A normalization of the values is performed. Comparisons based on the normalized values associated with the actions by the entity and one or more other values associated with ecological impact are displayed.

In an embodiment, a method of promoting improved environmental quality in a building includes acquiring values associated with environmental quality in a building A normalization of the values is performed. Comparisons based on the normalized values are displayed to occupants of the building. Ranges for acceptable environmental quality are shown and compared to the actual environmental values. For example, an acceptable range for carbon dioxide ("CO2") is shown and the actual CO2 levels are plotted to highlight if the current values are within the acceptable range.

Figure 1:
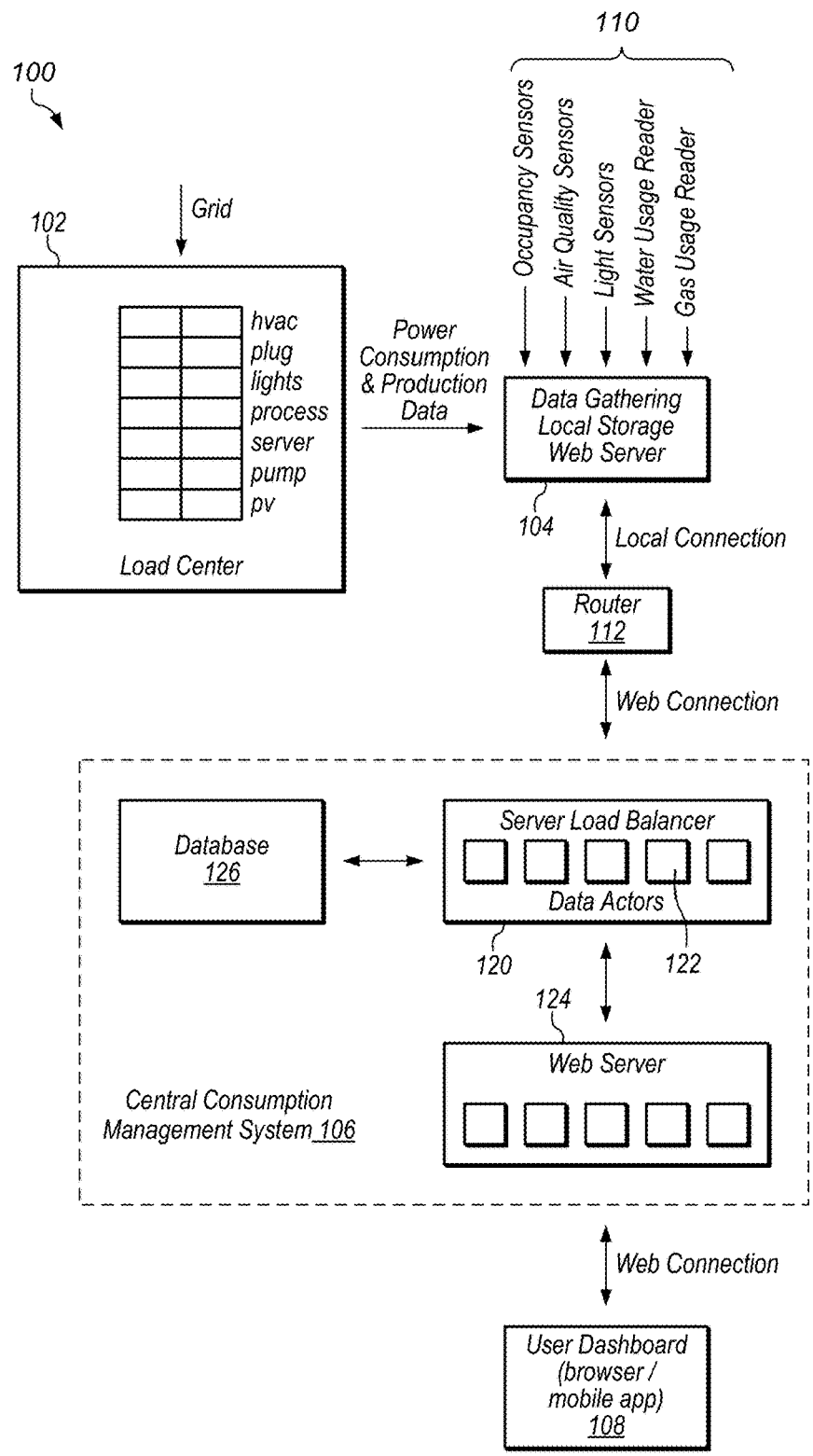
FIG. 1 illustrates one embodiment of a system for promoting lower resource consumption.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As used herein, displaying or presenting a "comparison" includes displaying or presenting information that shows differences between one value and another value. A comparison may be graphical, tabular, or other format. For example, a comparison of power consumption rates by two competitors may be displayed by tabulating usage of the two competitors for a given time period, or by displaying a graph having a different plot for each of the competitors.

As used herein, "entity" includes a person or a group of persons. Some examples of entities include a group of occupants of a building or segment of a building, the employees of a company, a team, a department, a city, a company, a department, or a class of students.

As used herein, to "handicap" means to adjust a value to compensate for one or differences in two or more things being compared.

As used herein, to "normalize" means to adjust one or more values to put the values on a common scale for comparison with another value, or to facilitate a fair comparison between two entities being compared.

As used herein, a "place" means a portion of a space, building, or location that can be occupied by one or more persons. Examples of a place includes an entire building, a floor of a building, a wing of a building, a factory room, a warehouse, a retail store, a place of business, a medical facility, a warehouse, an office, or the energy provided by a single outlet.

As used herein, a "resource" means a source from which a material, energy, or asset can be supplied for the use or benefit of a person or group of persons. Examples of resources include energy, electrical power, water, gas, fuel, and specific qualities of air and light within the building.

As used herein, a "user" means a person or groups of persons that can consume one or more resources.

As used herein in the context of observing a process or condition, "real-time" means without delay perceivable by the observer. A real-time display of power consumption may include an actual delay. For example, if a user turns off an appliance, an actual delay may occur before the user's power consumption display reflects the reading due to the time for the computer system to receive load sensor information, recalculate a value, and generate an updated display, and the network to transmit the updated information.

In some embodiments, a system displays current information about a user's consumption of a resource to the user. The user may be an individual person or a group of persons. The display may include real-time updates of the information. Energy consumption information may be refreshed on a frequent basis (for example, up-to-the-second). Resource consumption information may be displayed on any of various displays, including centralized screens, web pages of individual workstations, or mobile devices.

Consumption information may be presented at a compartmentalized level, in real-time. The display may be an entire building, a wing or floor, a single office, or a department spread across different sections of a building. Users may receive immediate notice of an increase or decrease power use. Additionally, user may receive notices whether or not the user is looking at a display. Important notices that correspond to energy consumption events or significant billing triggers may be "pushed" to users mobile devices to alert them to change consumption patterns.

In some embodiments, resource consumption information of one or more other users is displayed with resource consumption information of one or more other users or places. For example, consumption information may be presented showing user against user, department against department, and building against building. The data may be normalized to promote fairness (accounting, for example, for capacity, weather differences, varying facility ages) and then displayed so that each person or group can gauge its performance against another user. The comparison may be shown on any suitable time interval. Examples of time intervals for comparison include per second, per hour, per day, per business day, per holiday, per month, per season, and per year.

In displaying resource consumption information, a system may account for multiple variations between the places different users are located. Examples of variations that may be accounted for include building capacity, building age, weather differences, age of systems (for example, air conditioning system), number of occupants, and type of use (factory production, office, medical facility).

In some embodiments, a system includes energy use monitoring devices, such as power meters. The energy monitoring devices feeding information to a power consumption monitoring system may read consumption data down to the circuit level or the plug-level. The system may allow set-ups by a user (for example, a system administrator) and goals to be defined and redefined as needed.

Resource consumption information may be acquired for many different types of places and different users. A user may be individual or a group of individuals (for example, all the occupants on the floor of an office building). In some embodiments, resource consumption information is made accessible individually to each person. For example, each employee of a company may have access to a display showing consumption information for that employee, or showing consumption for a group of persons associated with that employee (for example, all the employees that share a floor of an office building with the employee.) Consumption information may be disseminated using any of various devices, such as a cell phone, tablet, desktop computer, local displays, or kiosks. By presenting information to individual users, the individual consumers receive information for bottom-up decision making. For example, if the system display shows an employee that energy is being wasted by overuse of a particular appliance, that employee can take corrective action to reduce use of that appliance.

FIG. 1 illustrates one embodiment of a system for promoting lower resource consumption. System 100 includes load center 102, data gathering server 104, central consumption management system 106, and dashboard devices 108. Load center 102 and data gathering server 104 may be located in an office building or other place where users of electricity and other resources (for example, water, gas or air) are located. Data gathering server 104 may be a local storage web server or data may be stored remotely. Load center 102 receives power from the electrical grid and distributes the power any of various loads, including HVAC systems, electrical outlets (plug loads), lights, processes, servers, pumps, and other electrical loads.

Load center 102 may transmit information about electrical power consumption to data gathering server 104. Data gathering server 104 may acquire information from sensors 110. Sensors 110 may be located at any suitable location for gathering information about conditions in or around the building or other place where a user is located.

Data gathering server 104 may be connected to router 112. Data gathering server 104 may exchange information with central consumption management system 106 via location connection to router 112 and a web connection.

Central consumption management system 106 includes server load balancer 120, resource consumption monitoring servers 122, web server 124, and database 126. Server load balancer 120 may balance loads for consumption monitoring servers 126.

Central consumption management system 106 may receive power consumption information and other information from data gathering server 104 for one or more places (for example, buildings, floors, wings, factories, stores, or residences). In some embodiments, central consumption management system 106 receives information from data gathering servers at multiple places. For example, central consumption management system 106 may receive power consumption from data gathering servers at all of the buildings owned by a particular company, all the retail stores in a particular area, all the residences in a neighborhood, or all the buildings in an office park.

Information may be stored in database 126. Consumption monitoring servers 122 may perform computations, comparisons, and analysis based on information from data gather servers. Consumption monitoring servers 122 may generate displays to users, including individual users at places being monitored. Information for generating displays to users may be transmitted to user dashboard devices 108. Each dashboard device may display consumption information to a user at one or more places being monitored. In one embodiment, consumption information for particular space is displayed to users (for example, office employees) occupying that space. Resource consumption information from other locations may also be displayed, such that a person at one location can compare his or her consumption with that of other persons.

Figure 2:
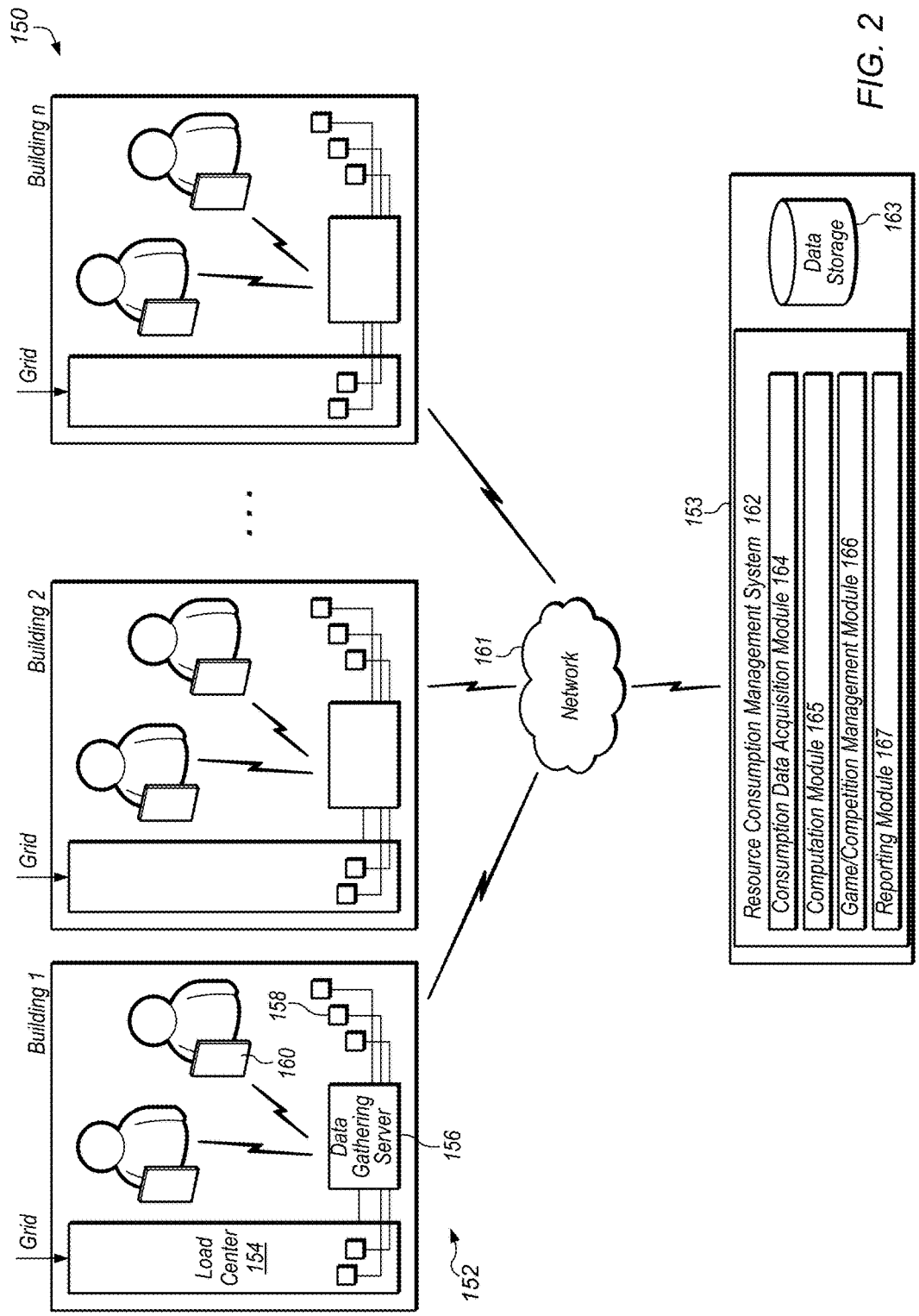
FIG. 2 illustrates one embodiment of a system for promoting lower resource consumption that monitors and reports resource consumption information from multiple facilities.

FIG. 2 illustrates one embodiment of a system for promoting lower resource consumption that monitors and reports resource consumption information from multiple facilities. System 150 includes facilities 152 and central consumption management system 153. Each facility 152 includes load center 154 and data gathering servers 156, and sensors 158. Employees at facilities 152 have dashboard devices 160. Load centers 154 and data gathering servers 156 may be located in an office building or other place where users of electricity and other resources (for example, water, gas) are located. Load center 154 receives power from the electrical grid and distributes the power to any of various electrical loads.

In the embodiment shown in FIG. 2, three facilities are shown for illustrative purposes. A system for promoting lower resource consumption nevertheless may in various embodiments acquire and report consumption information for any number of places. Resource consumption information may in various embodiments be tracked, analyzed, and reported on a building by building, floor by floor, or other basis.

Central consumption management system 153 may receive power consumption information and other information from data gathering server 156 for one or more places (for example, buildings, floors, wings, factories, stores, or residences).

In some embodiments, a consumption management system is implemented in the form of components. For example, in one embodiment, central consumption management system 153 includes resource consumption management system 162 and data storage 163.

Resource consumption management system 162 may be coupled to devices, sensors and equipment at facilities 152 by way of network 161. Resource consumption management system 162 includes consumption data acquisition module 164, computation module 165, game/competition management module 166, and reporting module 167.

Central consumption management system 153 may include one or more computing devices. In various embodiments, central consumption management system 153 may be provided by the same computing device or by any suitable number of different computing devices. If any of the components of central consumption management system 153 are implemented using different computing devices, then the components and their respective computing devices may be communicatively coupled, e.g., via a network. Each of the components may described above may include any combination of software and hardware usable to perform their respective functions. It is contemplated that a consumption management system may include additional components not shown, fewer components than described herein, or different combinations, configurations, or quantities of the components than described herein.

Resource usage measurement equipment, such as circuit sensors, may be provided in a system at suitable locations in each facility. In some embodiments, information is gathered for resource consumption measurement is gathered. A system may include power consumption measurement devices at a circuit-breaker level. The system may measure various characteristics or conditions of a facility, or resource consumption rates.

Consumption data may be gathered and displayed in real-time. Granularity may be done in any increment. In one embodiment, reporting of consumption is granular to less than 0.5 seconds.

In some embodiments, a comparison of one entity's consumption of a resource is displayed to a person in the entity. The comparison is based on normalized values associated with consumption of the resource. In some cases, consumption by the entity is compared with consumption by the user at a different time or under different conditions (for example, a graph showing current consumption compared with consumption one year ago). In other cases, consumption of the entity is compared with consumption by one or more other entities (for example, a graph comparing the entities consumption for the week with that of other entities.) In some cases, consumption by the entity is compared with consumption goals or objectives set by the user or administrator. This highlights the difference between the actual energy consumption and the set objectives.

In some embodiments, a user is presented with a radial graph that includes a time-wise display of the user's recent consumption of a resource. The display may be presented on a person's office computer, at a central workstation or kiosk, or on a portable electronic device such as a notebook computer, tablet, PDA, or mobile phone.

In some embodiments, the user is an individual user, and the display of the user's own consumption is presented to the user. In other embodiments, the user is a group (for example, the occupants of a building), and the display is presented to two or more persons in the group. The individual user's energy consumption can be identified/estimated without specifically measuring each element that they use that consumes energy. This is accomplished by tracking when users remotely adjust specific load centers. For example, the system will track if a user request for more heat or light in the building and will therefore attributed that additional energy consumption to the individual. Additionally, specific local plug loads (such as desk lamps and computers) energy consumption can be estimated on a time determined basis and then these loads can be attributed to the individual user based on the number of hours the user is within the building.

In some embodiments, information about use of an energy-consuming resource is displayed in a radial graph display. The current level of consumption is indicated by the distance of an indicator (for example, a radially projecting bar) from the center of the display. The display is updated each half second by periodically sweeping around the graph, such as in the motion of a second hand on a clock. The radial graph may automatically scale based on previously collected data for a user such that the user can see both their typical energy consumption at this time period as well as show enough granularity to see small changes in energy consumption.

In some cases, the radial display may simultaneously display, in radial form, the consumption of other users (for example, other competitors in a game). Related information, such as savings, usage, bill energy, or game results, may be presented on the same screen with the radial graph. In some cases, results of a competition may be graphically displayed (for example, on a line chart) on the same screen as radial display.

Figure 3:
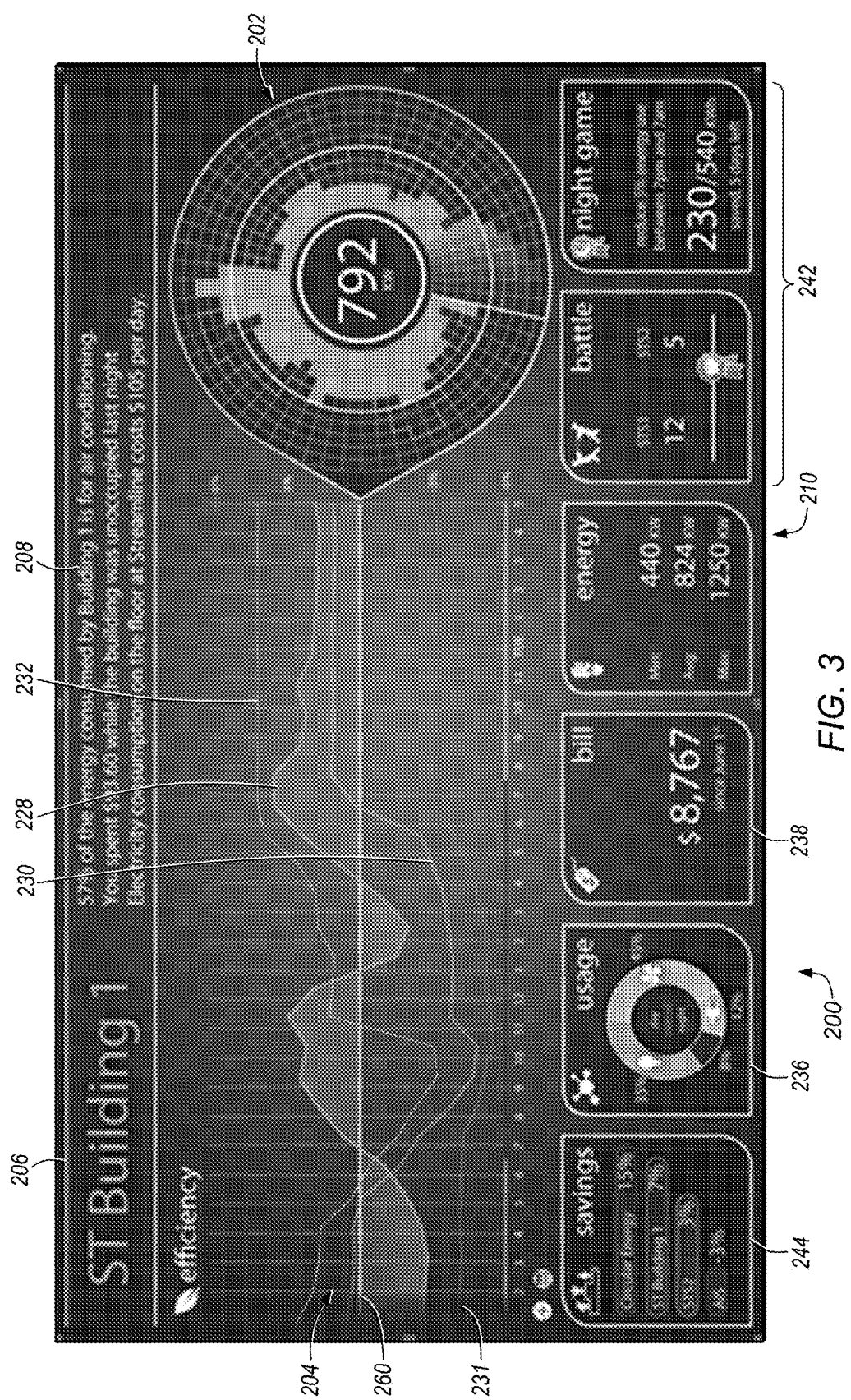
FIG. 3 illustrates one embodiment of a display having a radial graph of power consumption for a user.

In some embodiments, a radial graph shows resource consumption information based on the motion of analog clock in which data is displayed over time by rotating clockwise. FIG. 3 illustrates one embodiment of a display having a radial graph of power consumption for a user. Display 200 includes radial graph 202, line graph 204, place identifier 206, summary panel 208, and information boxes that can be tailored to specific clients needs 210.

Figure 4:
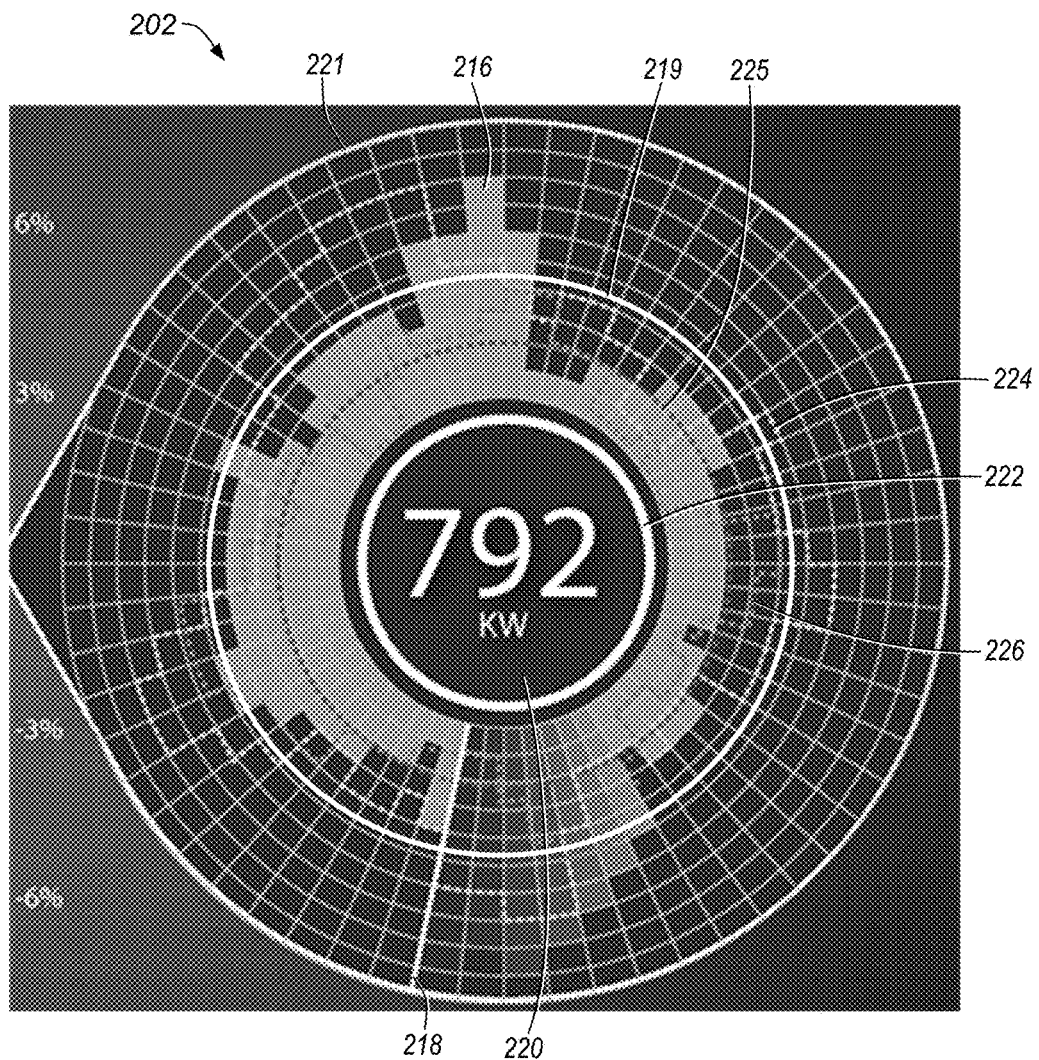
FIG. 4 is a detail view of a radial graph that can be used to report resource consumption.

FIG. 4 is a detail view illustrating a radial graph that can be used to report resource consumption. Radial graph 202 includes bars 216, radial grid 218, baseline indicator 219, instantaneous usage readout 220, and heartbeat ring 222. Current time indicator 218 may advance within circle 221. As current time indicator 218 advances around the circle, bars 216 may appear successively at the location of current time indicator. The length of each of bars 216 (as measured from the common base of the bars) may reflect the magnitude of power usage by the user during a one-second interval. For ease of viewing, the length of each bar 216 may be adjusted to precisely fill a column of boxes in radial grid 218. In certain embodiments, the consumption level for a user may be indicated by the level of light intensity, in addition to, or instead of the length of the consumption level indicators.

Baseline indicator 219 may show one or more base lines established for the user's consumption. Thus, in the illustration shown in FIG. 4, in the part of the graph where the shaded bars 216 are within the circle defined by baseline indicator 219, the user is used less power than the baseline level, while in the part of the graph where the shaded bars 216 project outside of the circle defined by baseline indicator 219, the user consumed power above the baseline level.

In some embodiments, values associated with consumption levels are scaled to make different conditions, circumstances, times, or entities to be comparable. In some embodiments, a user is presented with graphical information on the current usage and historical usage. The user may compare its own current usage versus historical consumption (for example, previous day, month, or year) or against a set goal or objective. A score algorithm may be applied to each competitor. Data may be normalized for the different conditions, circumstances, or times to make a useful comparison. In some embodiments, the system aggregates multiple inputs across multiple devices. The system can configure virtual inputs as values of other physical inputs (for example, A=B+C, A=B−C) and as factors of physical inputs (for example, A=0.3*B).

In some embodiments, data input is scaled such that the graph automatically zooms to show details of minor changes yet expands when increases exceed the graphs boundaries. The radial axis may automatically scale such that relative changes are very noticeable. For example, if over the course of a day if all of the change are within the 3000-4000 W range, the radial axis may only show 3000 to 4000 W and ignore the 0-3000 W range.

At the center of radial graph 202, instantaneous usage readout 220 a number indicates the instantaneous usage. The user may select the units for the reading to different units or equivalent measures, including kWh, dollars, or $CO_2$.

In some embodiments, a radial graph shows usage of one or more other users. For example, in FIG. 4, plot 224 may represent a level of usage for another user an occupant or group of occupants of a different building during the same time period.

Referring again to FIG. 3, line graph 204 is an x-y graph showing usage during recent time period, such as the preceding 24 hours. Plot 228 on the graph represents the user's own consumption. Other plots 230, 231, and 232 may represent consumption of other users during the same time period, by the same user at a different time (for example, the same period one year ago) or a specific targeted goal at that period of time.

In some embodiments, the colors of the graphs are configurable. For example, the user may be able to choose a color of bars 216, any of the plots on radial graph 202 or line graph 204, or both.

Figure 5:
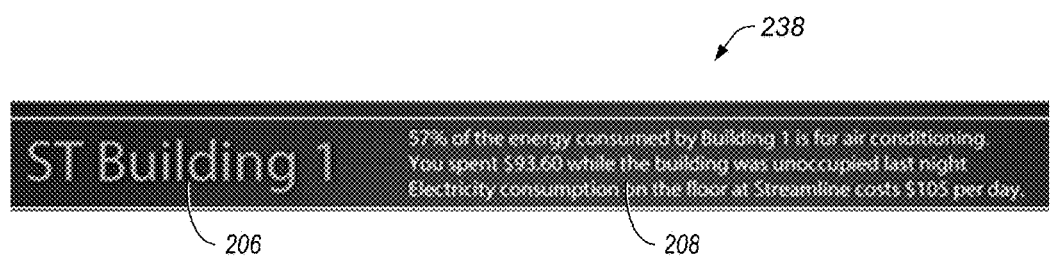
FIG. 5 illustrates a banner for a user display for real-time power consumption by a user. The banner may show specific energy consumption tips and details about which loads are on or off based on the software algorithms.

FIG. 5 illustrates a banner for a user display for real time power consumption by a user. Banner 238 includes place identifier 206 and summary panel 208. Summary panel 208 may provide information, status, or recommendations to a user to promote lower consumption of the resource being monitored. This banner can also alert users about specific resource events. For example, if a device is turned off/on or if the building is approaching a new peak consumption and then give users advice on how to avoid the peak.

Figure 6:
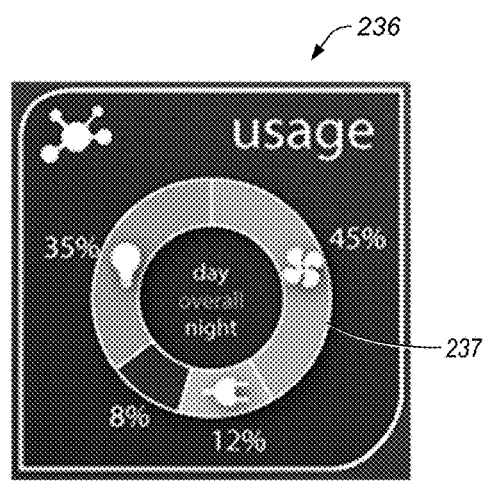
FIG. 6 illustrates one embodiment of a usage box for a display.

Usage information boxes 210 (from FIG. 3) include energy usage box 236, cost box 238, game status/results boxes 242, and savings box 244. One or more of usage information boxes may include a pie graph. Over time period selected the pie graph shows the kwh and percentage of the different components of energy consumption. Center buttons (overall, day, night) change the pie graph to show consumption during night/day or both within the time period selected. FIG. 6 illustrates one embodiment of a usage box for a display. Usage box 236 includes pie chart 237.

Figure 7:
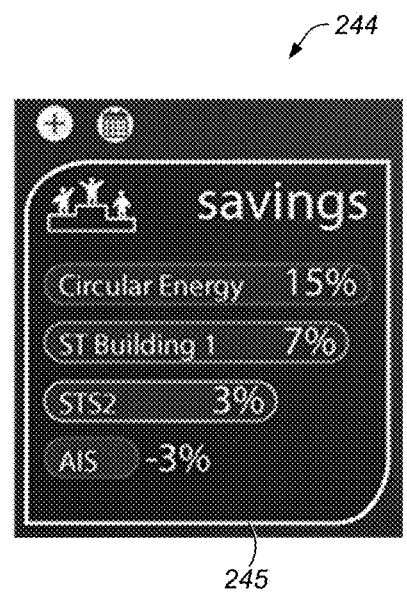
FIG. 7 illustrates a competition results box for a competition among users.

FIG. 7 illustrates a competition results box for a competition among users. Competition results box 244 includes tabulation 245 that compares savings for each of four competitors in a game over various time periods (hour, day, week or month) configurable in the competition setup.

Figure 8:
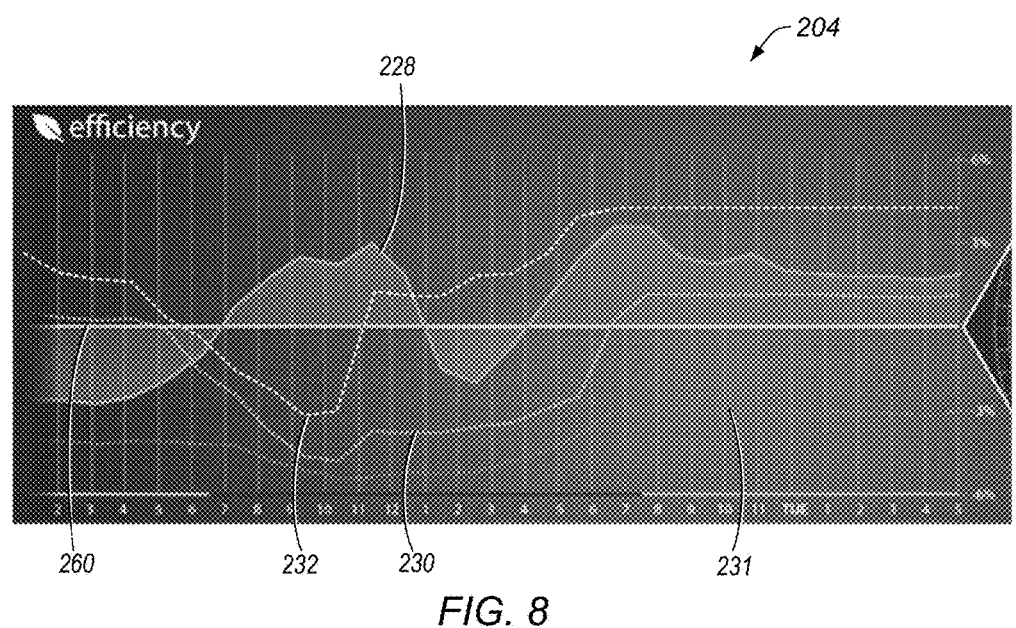
FIG. 8 illustrates a line graph showing results of a competition.

FIG. 8 illustrates a line graph showing results of a competition. Each of plots 228, 230, 231, and 232 show resource consumption rates for the 30 hour period preceding the time of the display. Plot 228 may show values reflecting the viewer's own consumption (or, consumption for the entity of which the viewer is a part.) Each of plots 230, 231, and 232 may show resource consumption for a different competitor. In some embodiments, plots in a line graph, a competition results box, and radial graph are color-coded (for example, orange for the competitor's own consumption or scoring, blue for Competitor A's consumption or scoring, red for Competitor B's consumption or scoring).

Figure 9:
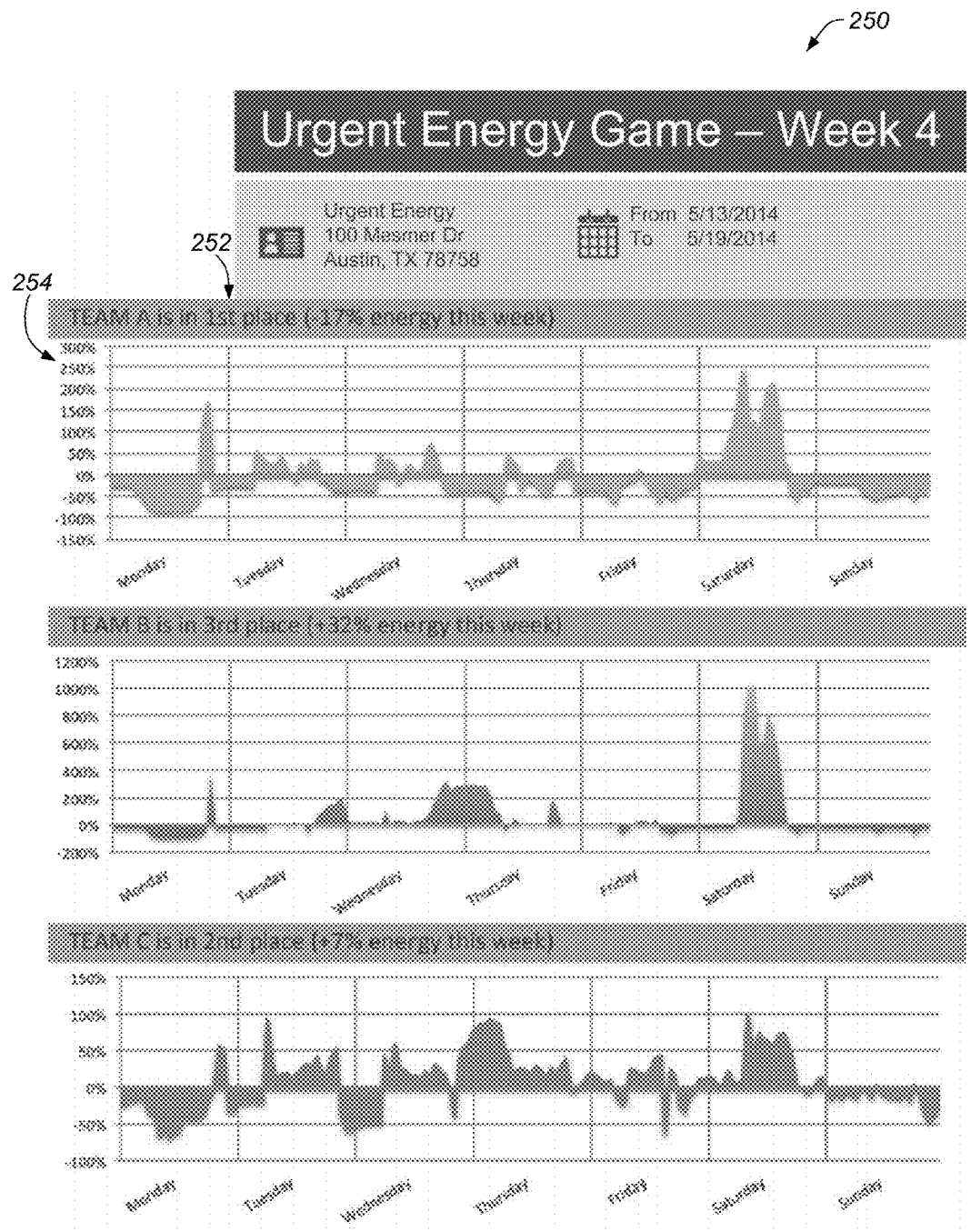
FIG. 9 illustrates a weekly report showing the status of a competition among teams.

FIG. 9 illustrates a weekly report showing the status of a competition among teams. Report 250 includes team results 252 and graph 254 for each team in a company. The teams within the company may compete against one another in a game. Each team can review current results and usage for itself and the other teams in the competition.

Figure 10:
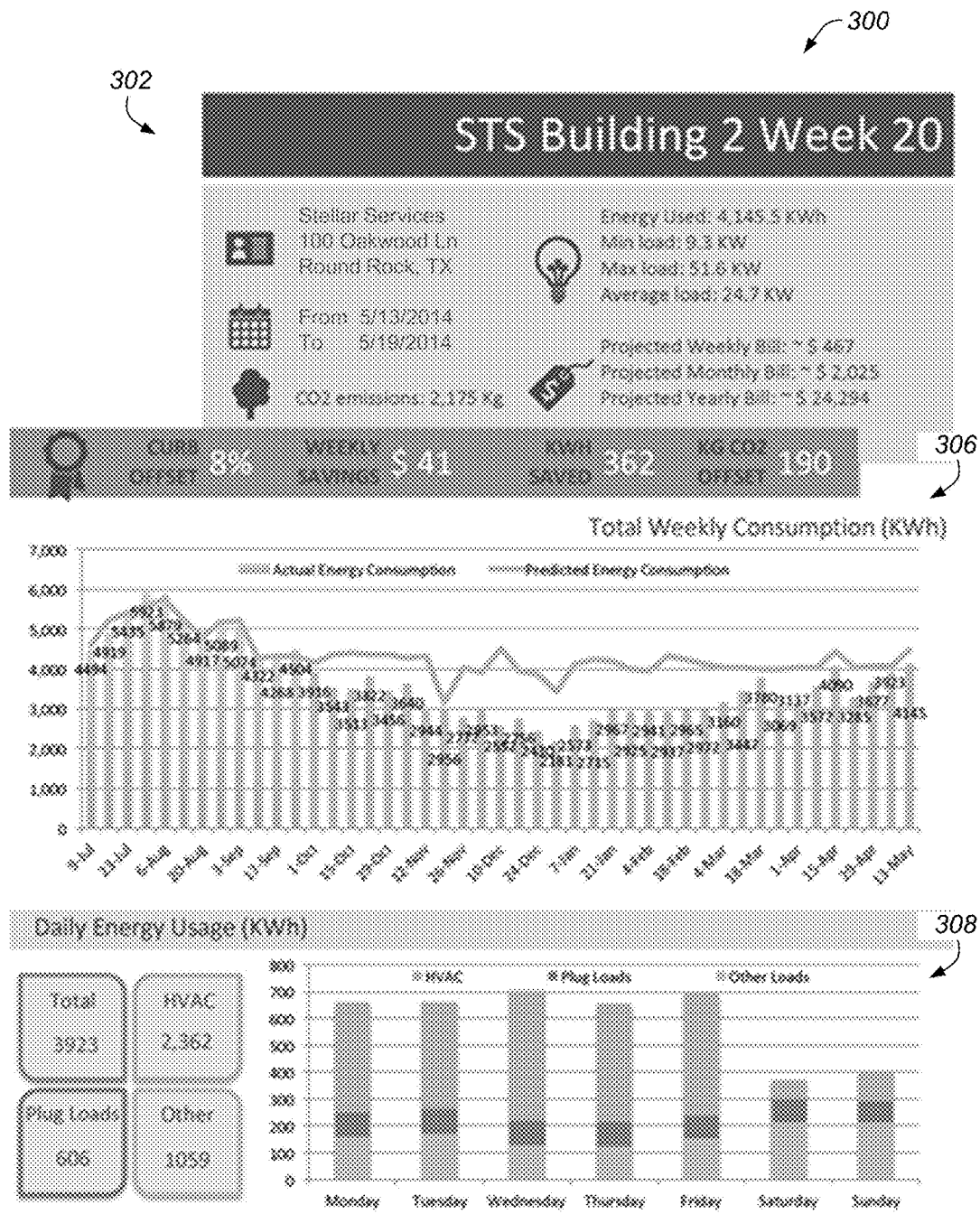
FIG. 10 illustrates one embodiment of a report showing a user's consumption and savings that can be displayed on a user device.

FIG. 10 illustrates one embodiment of a report showing a user's consumption and savings that can be displayed on a user device. Report display 300 includes summary panel 302, savings summary 304, weekly consumption graph 306, and consumption breakdown panel 308. Consumption breakdown panel 308 provides a breakdown based on different kinds types of loads, such as HVAC, plug loads, and other loads.

Figure 11:
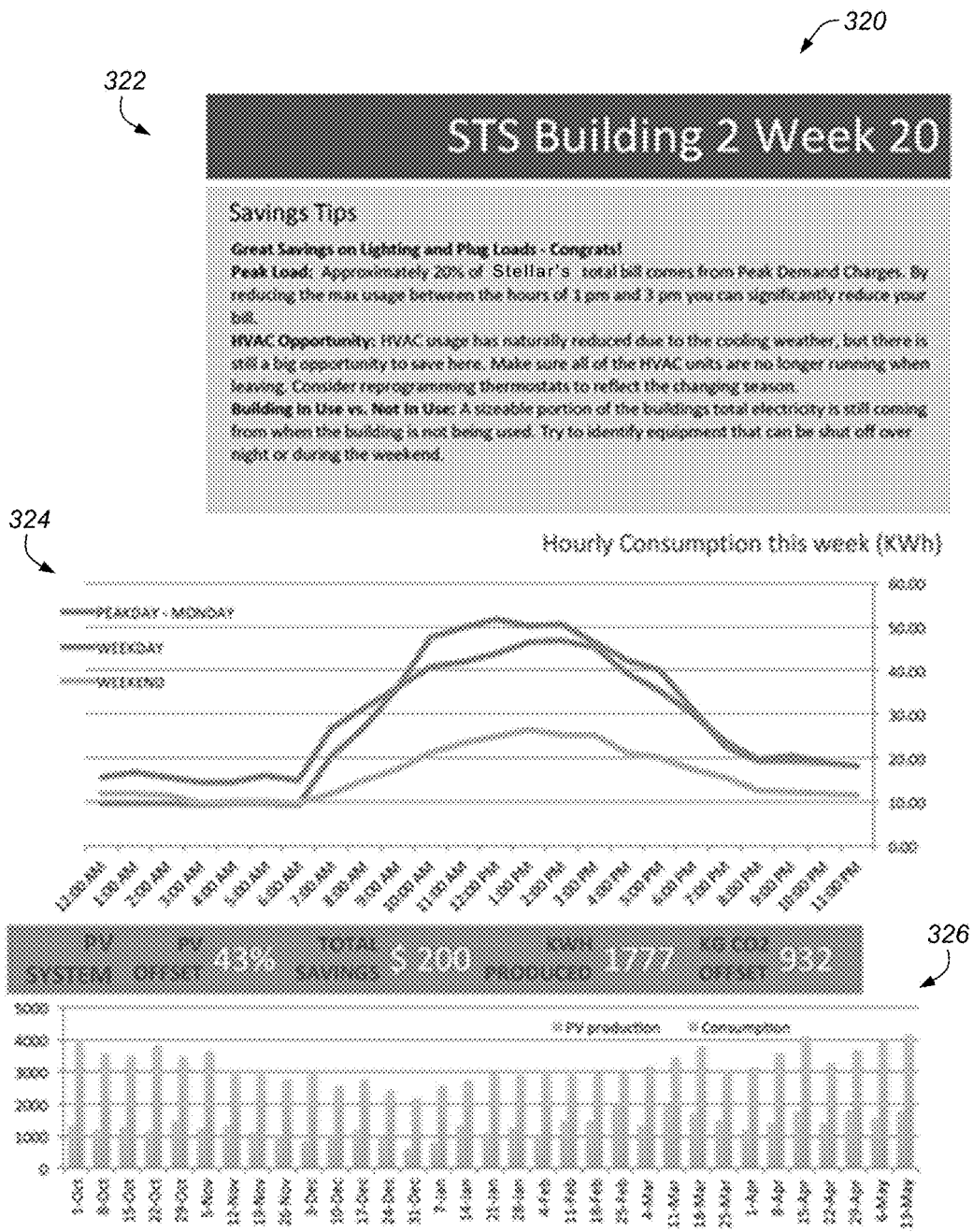
FIG. 11 illustrates one embodiment of a second report of a user's consumption and savings that can be displayed on a user device.

FIG. 11 illustrates one embodiment of a second report of a user's consumption and savings that can be displayed on a user device. Report display 320 includes savings tips panel 322, daily profile 324, and solar production summary panel 326. Daily profile 324 includes a graph showing lines for workday, weekend, and the day where the peak load occurred. Solar production summary panel 326 may graph solar production (for example, from photovoltaic cells) compared to the total consumption since the system was installed at a facility.

Figure 12:
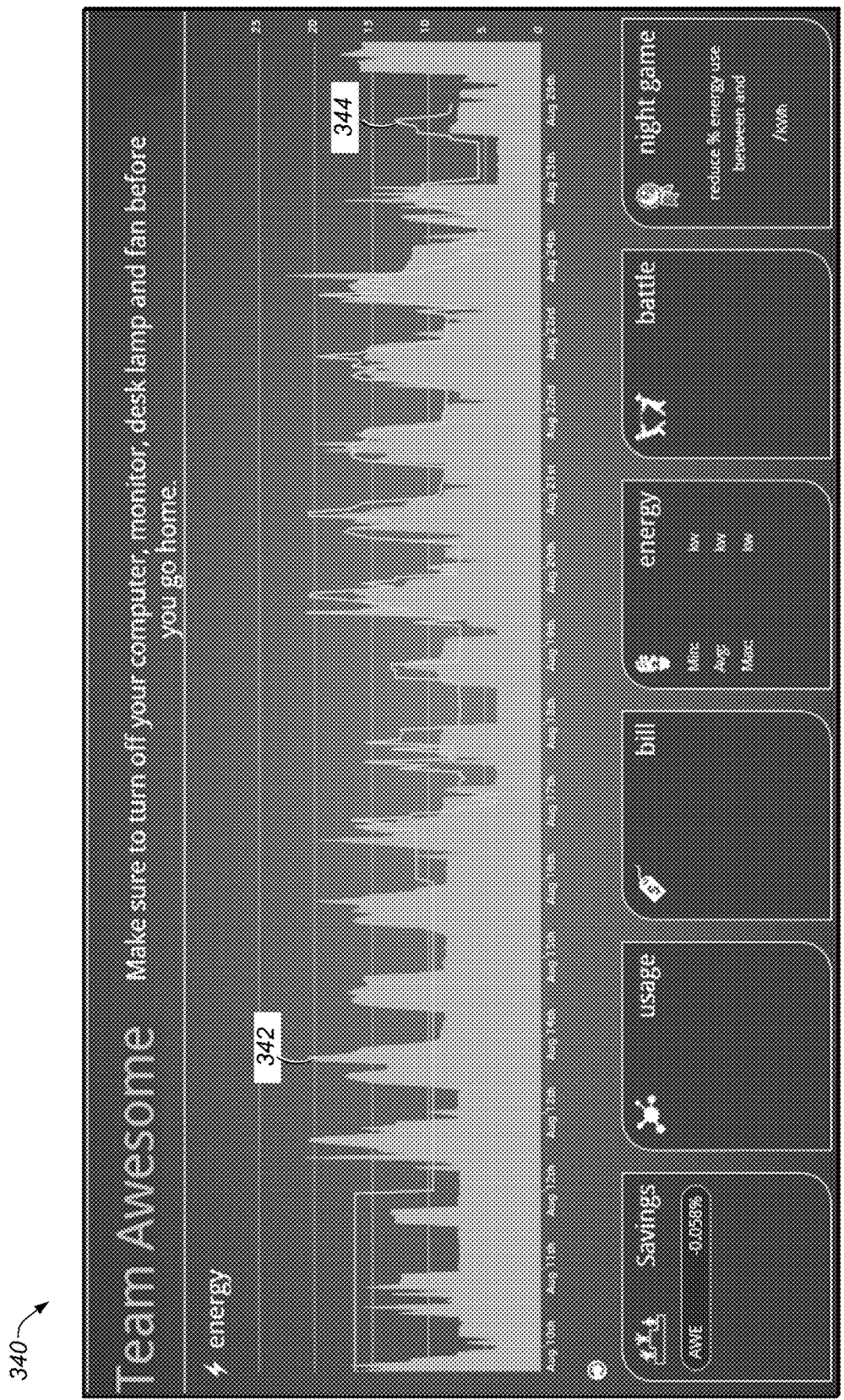
FIG. 12 illustrates a display of a historical view for resource consumption by a user.

FIG. 12 illustrates a display of a historical view for resource consumption by a user. Historical view 340 includes graph 342. The graph may show all dates of the viewer's energy consumption. Consumption may be shown based on monthly, daily, hourly or minute intervals. The user has the ability to zoom in on any specific date in time (for example, by clicking and dragging the cursor). Plot 344 shows the actual resource consumption. Using this mechanism, the user can identify dates or times when more or less energy has been used. Line 346, plotted on top of the data, may indicate the projected baseline. The baseline m allows the user to see what the user's expected energy consumption is for a particular time frame.

Figure 13:
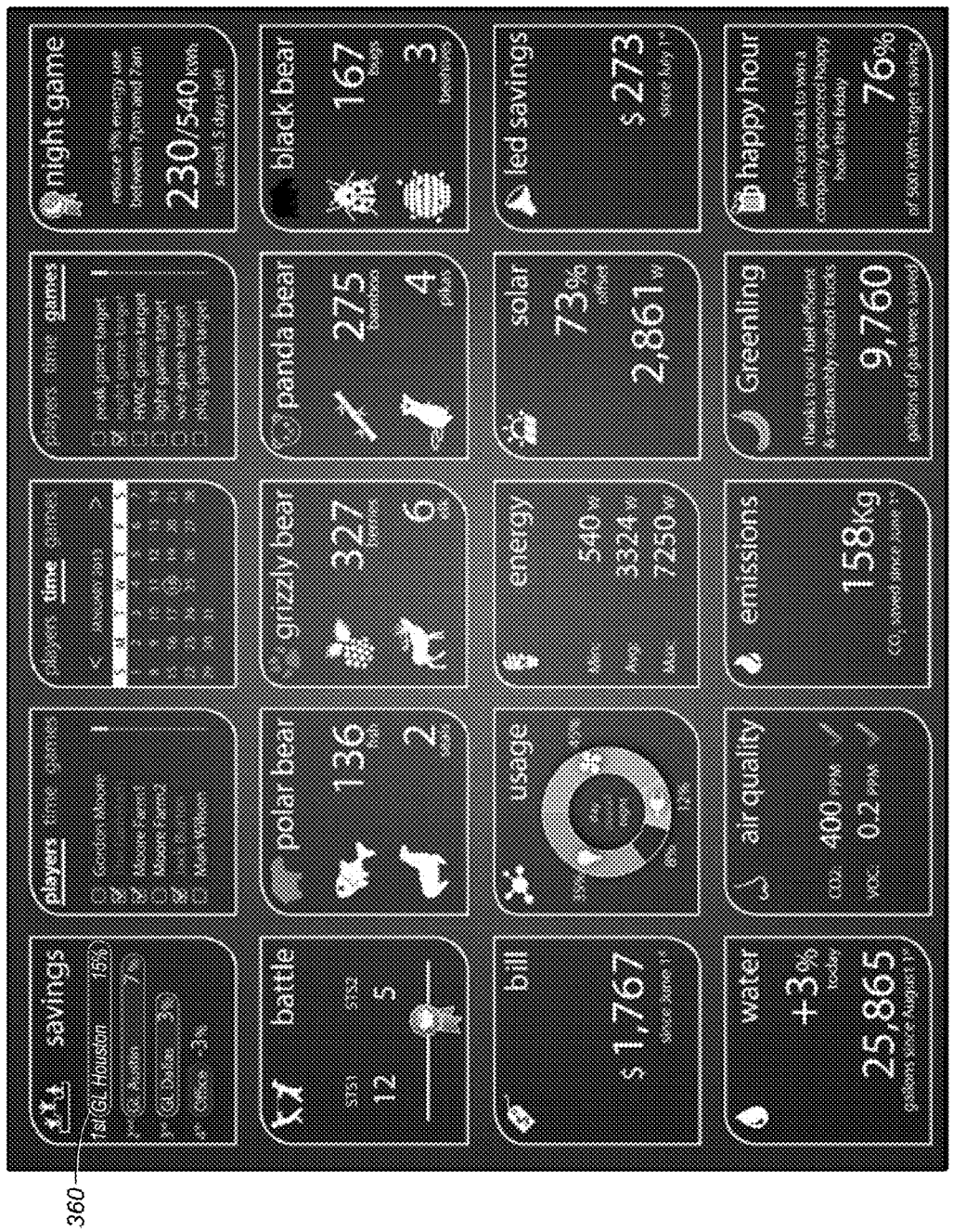
FIG. 13 illustrates one embodiment of a set of widgets for a power consumption display.

In some embodiments, a graphical display for providing information about consumption of a resource includes a user-selected set of widgets. FIG. 13 illustrates one embodiment of a set of widgets for a power consumption display. Each selected widget may display different information to the user. Widgets 360 may be selected and arranged by a user. In some embodiments, widgets may allow a user to establish characteristic for a completion between other resource consumers. A menu or selectable list be provided to take input from a user to select competitors for a game, a type of game, a date or date range for a game, or other characteristics of a competition. In some embodiments, a widget provides results or user performance information, such as amount of energy saved, amount of energy offset by solar production.

Figure 14A:
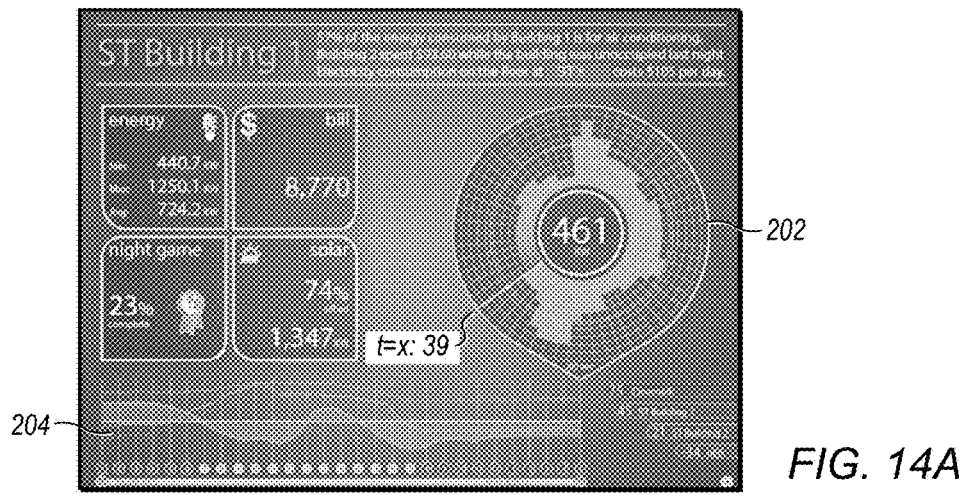
FIGS. 14A through 14C illustrate a radial graph display at different times.
Figure 14B:
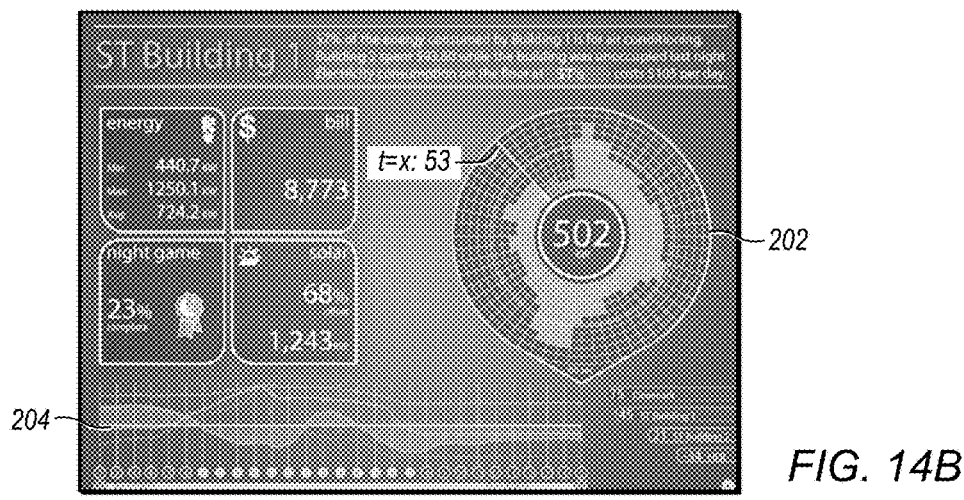
Figure 14C:
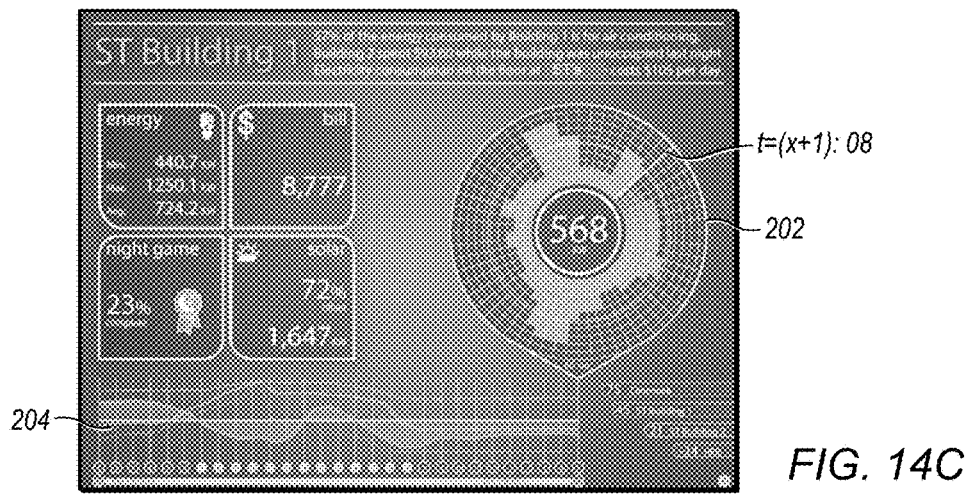

A radial graph may display power consumption information in real time. During operation, the graph is continually fed in 1 second intervals. Every time a second goes by, the total power draw from the interface is updated. In order to highlight which time segment is being updated, there may be a fading effect some segments ahead of the current one. For example, in one embodiment, the fading effect is applied to next 5 segments that ahead of the current consumption indicator. FIGS. 14A through 14C illustrate a radial graph display at different times over a 29-second period. FIG. 14A is at time=x:39. FIG. 14B is at x:53, a point in time 14 seconds after the time of FIG. 14A. FIG. 14C is at (x+1):08, a point in time 15 seconds after the time of FIG. 14B.

In some embodiments, a system displays an indicator that has one or more characteristics analogous to a physiological indicator. The physiological indicator may represent resource consumption by the user. In one embodiment, the display includes an indicator that pulses like a heartbeat.

In some cases, a display includes one or more energy consumption indicators that are suggestive of physiological indicator. In one system, for example, a circle or ring on the display flashes on and off as a "pulse rate" suggestive of a heartbeat. A higher pulse rate indicates a high level of energy consumption, while a lower pulse rate indicates a lower level of energy consumption.

Figure 15A:
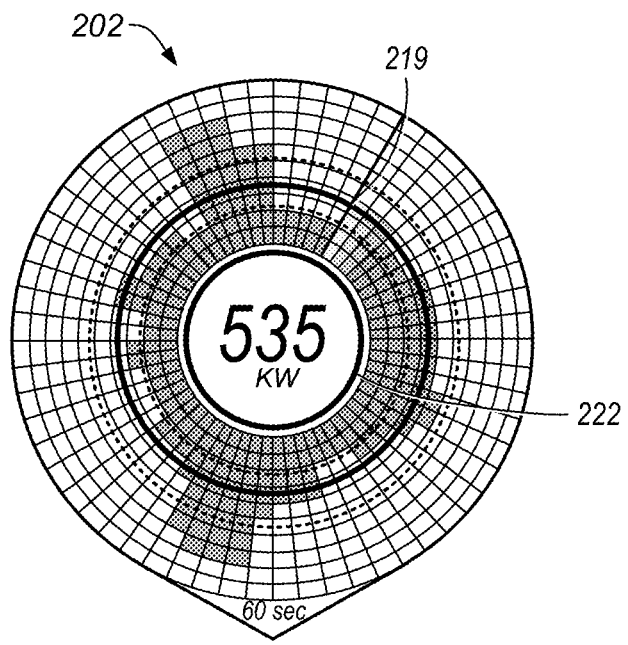
FIGS. 15A and 15B illustrate a display including a heartbeat visual indicator in a radial graph of power consumption.
Figure 15B:
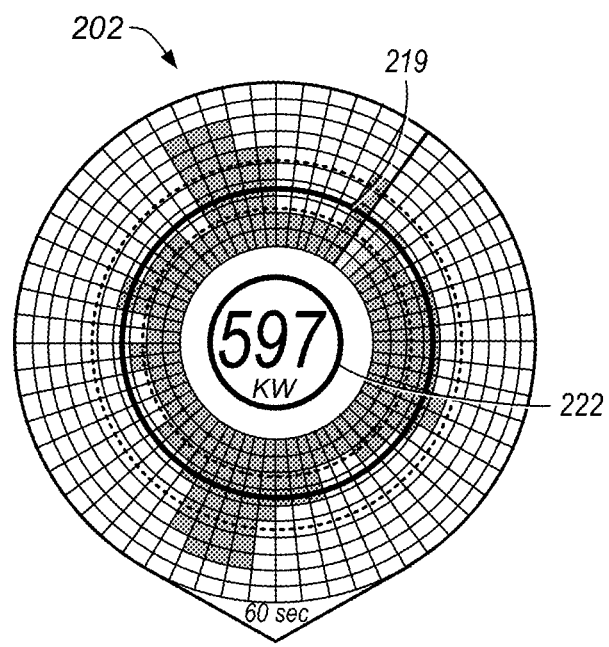

FIGS. 15A and 15B illustrate a display including a heartbeat visual indicator in a radial graph of power consumption. Heartbeat ring 222 is included at the center of radial graph 202. Heartbeat ring 222 pulses such that the ring dilates and contracts on the display at a rate similar to that of a human pulse. For example, at time=x:05, the ring may be at a dilated state as shown in FIG. 15A, while one second later at time=x:06, heartbeat ring 222 may be at a contracted state as shown in FIG. 15B. The rate of pulsing of heartbeat ring 222 may correspond to a rate of consumption by the user. As consumption increases, the pulse rate increases in manner suggestive of a heart under stress (for example, while exercising). As consumption decreases, the pulse rate may decrease to a rate suggestive of the heart rate of a person at rest. In this manner, the view of the display may present a continuous indicator of whether the user's consumption is at a relatively high level, moderate level, or a relatively low level. The pulse rate may also change based on the normalized consumption such that high pulse rates only occur when the energy consumption is much higher than the typical energy consumption at that time. (For example a high pulse would result from light being left on in the middle of the night). The actual energy consumption may be low but it is much higher than the typical energy consumption at that time period. Examples of other physiological indicators include shivering, wheezing, or breathing intensity. Units of energy (kWh) or power (kW) in the display are not typically well understood by most individuals. Additionally, the absolute values of these factors are not typically reviewed so there is little reference to know if a particular power consumption is high or low. By using physiological display methods, an untrained user may be able to intuitively understand if the building is using too much energy (typically illustrating waste) and may thus be more motivated and have information to correct the situation.

As noted above, the display may include information about other users' power consumption in addition to the user. In some embodiments, users may participate in a games or competitions with one another. The display may provide information about how the user is doing in the game relative to other competitors. Referring again to FIG. 4, bars 216 in radial graph 202 may represent power consumption by the "home" team while the overlay plots 224, 225, and 226 may represent power consumption the competition (in this case, three other competitors). Displaying information of the user and other users on the same graph may show the user how it is doing in comparison to the other users in the competition. Information on how the user is doing in comparison to competitors may motivate the user to reduce its energy consumption. In some embodiments, plots 224, 225, and 226 are color-coded (for example, orange for the competitor's own consumption or scoring, blue for Competitor A's consumption or scoring, red for Competitor B's consumption or scoring).

Line graph 204 may show who is winning a cumulative game. In FIG. 8, plot 228 represents consumption by a user, while each of plots 230, 231, and 232 represents consumption by a different user (a competitor in the game). The values represented by the lines may be normalized with respect to one another. For example, if User A is a café and User B is an aircraft manufacturing facility, the values may be normalized to create a fair competition for reducing energy consumption between User A and User B. Each hour of the last 24 hours is normalized independently.

Base line 260 (in this case, the x-axis on line graph 204) may represent the baseline or expected consumption for the user to which the graph is being displayed. For example, if the user's line is above base line 260 then the user may be consuming more energy than they typically did historically in that hour. Historical data comprising the baseline can be from the previous day, week, months, year or some algorithmic combination of each of these time periods. In some embodiments, the background is highlighted in different colors above and when below base line 260. For example, the background may highlight red (like a stoplight) when user line 228 is above base line 260, and highlight green when user line 228 is below base line 260.

Values may be scaled to make competitor scores comparable. A score algorithm may be applied to each competitor. Data between competitors may be normalized such that two entities can compete on an even footing. Normalized data inputs such that minor changes in behavior result in sizeable changes in the competition. The system may aggregate multiple inputs across multiple devices. In some embodiments, the system aggregates multiple inputs across multiple devices. The system can configure virtual inputs as values of other physical inputs (for example, A=B+C, A=B−C) and as factors of physical inputs (for example, A=0.3*B).

In some embodiments, an administrator page allows input an hourly normalized score for each competitor. Different profiles (in office/out of office) may be automatically selected based on administrator-selected criteria, such as the day of the week. For example, different profiles may be provided for weekends and week days. The System Administrator page may allow user to select profile for different days in advance or set a weekly or monthly or yearly patterns.

In some embodiments, the system allows a social comparison to inspire competition between teams or individuals. A relative comparison may be done to provide context about what is normal. A scoreboard may show each view how they are currently doing when compared to his or her competitors. This will show, for example, who is "winning" the current day such that individuals are incentivized to change their current behavior. The display may provide a connection between the real time graphs that are updated each second and the leader board which reflects the score over the month.

Using the system, gamification of consumption monitoring among two or more user competitors may be managed. Gamification may encourage individuals to change behavior based on, for example, winning badges, changing colors, or beating their peers. A gamification may be chosen to get greater engagement from employees or other building occupants (such as residents). The system may target specific opportunities to reduce wasted energy.

In some embodiment, the system allows an administrator to select from a set of games of varying lengths. For example a system may support short term games (for example, hourly, weekly) and longer term games (for example, quarterly, seasonal, or annual). The time frame of any game may be selected to maintain engagement or focus on reducing billed amount. Short term games may roll up in to long term game using the points system.

Games may include a set of teams and individual awards. User profiles may be established and maintained for each team and individual. The system may enable links and ability to post on outside social media sites (for example, Facebook™, Linked In™, or Twitter™) Individuals may keep track of their points. The points of one team member may differ from other team members because of other challenges, objectives, interactions, or previous team challenges.

In some instances, specific game mechanics shall be deployed that where users risk losing the points they have earned if they do not adjust their resource consumption behavior. This creates a different kind of motivation as opposed to gain points which has been found to have an extremely impactful result on encouraging a specific type of behavior.

The following are examples of characteristic that may be included in games managed by the system.

Game Example 1:

Monthly Leader board:
1) The objective of the monthly leader board is as follows:
   1) Illustrate how teams are progressing over time
   2) Provide a summary of the competition
2) Each day a winner is decided based on configurable characteristics. Example characteristics:
   1) greatest percent reduction from average
   2) greatest absolute reduction from average
   3) greatest progress toward goal Game Example 2

Example of Gamification Mechanics and Details:

Rules

Time frame: Games are configurable to last different time

Objective: Team with the most points wins the competition

Rewards:
   Levels—change your color based on # of xxx earned
      Points—X points to get to the next levelXxx can be points, kwh, dollars, etc.
      Badges—based on completing specific missions/games (based on anything, not just points)
      Can be team or individual specific Levels:
   Levels are adjustable for each game setup to encourage involvement
   only the current level points need may be shown so that next level points can be modified Level 1: 1000 pts
Level 2: 2000 additional pts above level 1
Level 3: 3000 additional pts above level 2
Level 4: 4000 additional pts above level 3
Level 5: 5000 additional pts above level 4
Level 6: 6000 additional pts above level 5
Level 7: 7000 additional pts above level 6

Example Game Scoring System:

| Objective | Points |
| --- | --- |
| Win an hour | 10 pts |
| Win a day (extra points) | 200 pts |
| Win a month (extra points) | 10,000 pts |

Example Short & Long Term Games:

| Objective | Points |
| --- | --- |
| Reduce Peak level: (DAILY) Team who reduces their Peak demand in a 24 hr cycle by the greatest percentage over their historical level | 300 pts, Peak Badge |
| Reduce Base Level: (DAILY) Team who reduces their Base consumption level in a 24 hr cycle by the greatest percentage over their historical level receives a point. | 300 pts, Base Badge |
| Reduce HVAC Load: (DAILY) Team who reduces their HVAC consumption level in a 24 hr cycle by the greatest percentage over their historical level receives a point. | 300 pts |
| Reduce After Hours Load: (DAILY) Team who reduces their After Hours consumption level in a 24 hr cycle by the greatest percentage over their historical level receives a point. | |
| Reduce from Previous Week Recorded Value: (WEEKLY) Best overall | 2,500 pts |
| Set Value Challenge: (DAILY) Reduction from previous days' consumption by a set percentage. Winner is determined by who exceeds to set value, if both teams reduce by the set level, extra points are awarded to the team that does better overall. | 300 pts |
| Monetary Goal Challenge: (DAILY/WEEKLY) Special event challenge that allows competitors to compete together for energy savings. Savings for the time frame can be applied to charity donations or office parties. Points awarded to all participants. | 300 pts daily, 2,500 pts weekly |

In some embodiments, a user can select the competitors to be included in a competition. For example, a company may be able to select which other companies it will compete against. As another example, a residential user may be able to pick which neighbors the user will compete against in a game. In some embodiments, the system may present the user with a drop-down menu that allows the user to select competitors from the menu.

In some embodiments, a system gathers and displays information about use of an energy-consuming resource, such as an air-conditioning system, to a user of the resource, while the resource is being used, based on one or more benchmarks determined by the system. In some cases, information is displayed to the user in real-time. The user of a resource may be an individual or a group of individuals (for example, all of the occupants or a home or office building). Users may be motivated to reduce energy consumption based on the information displayed.

In some cases, a residential user's consumption level may be compared to one or more other residential users. For comparison purposes, each user's consumption may be normalized based on each user's past consumption, weather, building size, number of occupants, and age of construction. For example, each residential user's consumption may be normalized based on what that user was consuming during some previous time period (for example, a one-hour time period 24 hours ago, or 7 days ago).

In some embodiments, a system gathers and displays information about use of an energy-consuming resource, such as an air-conditioning system, by one or more users of the resource. The information provided to the system is analyzed. Patterns may be identified for particular users. Based on the information gathered and learning by the system, each user may be presented with suggestions on how to reduce energy consumption. A user may also be assigned goals or targets for reducing consumption.

In some embodiments, a user is presented with a display showing a comparison of the user's goals with actual consumption. In one embodiment, a user display includes a line graph showing a plot of the user goal versus actual consumption as a function of time. The differences between goal and actual consumption may be highlighted. For example, if the user is outperforming the goal, the period of outperformance (e.g., above the baseline) may appear shaded in green on the graph, while a period of underperformance (e.g., below the baseline) may be shaded in red on the graph.

In some cases, the system identifies and tracks specific devices/systems based on load signatures. For example, based on characteristics of the load when the unit is switched on, the system may identify that a particular type of air-conditioning unit is being operated. Goals or recommendations may be tailored using the information about how and when particular devices/systems are being used. Recommendations may also be displayed based upon the level of success achieve from previous recommendations. In some embodiments, a system performs predictive analysis based on collected energy use data.

In some embodiments, one or more baselines are established for a user. The baseline may be used to identify where there are opportunities for reduced wasted resource consumption. Examples of factors and systems that may provide opportunities for reduced consumption include unoccupied building loads, HVAC, and lighting. The system may automatically identify opportunities.

In certain embodiments, a system compares a hypothetical perfect building to particular building and identifies waste within different processes and mismanagement. Historical usage may be reviewed to identify trends or anomalies within a particular entity's consumption as compared to its competitors.

In some embodiments, a baseline is established by assessing optimum or minimum usage for a place based on selected past measurements of consumption in the place. To establish the baseline, an interval of interest, such as 24 hours, may be selected. Data for a historical period, such as consumption over the last year, may be analyzed to identify optimum or minimum energy usage. For example, minimal usage points may occur at certain times of day, when no one is in the building. Minimum values may be used to establish a baseline value. The baseline values may provide a user with an indication of how well the user could be doing in its level of consumption. The system may update the baseline based on learning from additional minimum data points as the system operates.

In some embodiments, triggers are established based on specific electrical signatures of components or systems in a place where consumption is being monitored. An electrical signature may be based on, for example, electrical load characteristics of power consuming system, such as an HVAC system. A notification may be displayed to a user when a specific load at the user's location is switched on or off.

An event ticker may be used to distinguish and highlight events that have a large effect on the energy usage. For example, turning on a set of lights may register an increase of 500 watts, the event ticker would read "Bay Lights On". The ability to determine the increment amount (i.e. 1 W, 5 W, 20 W, or 500 W) may be dynamic. The label that is attached to them may be configurable.

A value related to the threshold change in power may be configurable within the administrative settings so that only changes of a specific magnitude trigger a ticker event. For example, with a trigger of 300 W, a 100 W change might not trigger any events tickers, but a change of 500 W would trigger the review of table and the event "bay lights on/off". During the on-site configuration of a particular entity, an initial table of Events and Values may be developed. The table should have the ability to be updated remotely as greater insight into the energy consumption become available. Table 1 shows an example input structure.

TABLE 1

Example of Configuration Events for Ticker

| Change | Tolerance | Time Period | Tolerance | Event | Color |
|---|---|---|---|---|---|
| 500 | 10 | 1 | 0.5 | Bay Lights | Yellow |
| 3 | 1 | 5 | 2 | AC Fan | Yellow |
| 800 | 200 | 1 | 0.5 | Compressor | Orange |

Each input may have its own Event Table with X rows for specific events. If two events have very similar load signal or "value", a physical reconfiguration of the monitoring device may be necessary to break the two different events into different inputs.

In some embodiments, a system allows group of users to control an energy-consuming resource by allowing each user cast a vote. For example, each occupant of an office building may vote on what temperature to set a thermostat at or whether to raise or lower the setting on the thermostat. The operating settings for the resource may be determined by an algorithm based on the combined input of the users in the group (rather than, for example, the noisiest member of the group). Patterns of each user may be tracked, and each user's changes attributed to total energy consumption (for example, the user's contribution to the energy bill). Individual users may be provided with feedback to promote reduced energy consumption. In some cases, an individual user is presented with options to offset the user's energy usage with energy-saving measures, such as turning off the user's lights or printers.

In an embodiment, a system allows users to control the HVAC system by casting a vote about their thermal comfort. Specific users' patterns may be tracked. A change in the energy bill (projected or actual) may be attributed the user's vote. If a particular user's vote had the effect of increasing consumption, feedback may be provided to users. The feedback may include suggestions on an action to offset the effect of the user's vote.

In many embodiments described above, games and user comparisons are described for energy consumption. A system may nevertheless, in various embodiments, incentivize any behavior desired by a business or other organization. Examples of objectives that may be promoted using games or user comparison displays such as described herein include ecological footprint, green initiatives, cultural improvements, environmental quality, and marketing. Additionally, objectives can be surrounding improved health for building occupants by changing air circulation patterns or changing the air chemistry, composition, or filtration levels.

In one embodiment, a system presents occupants of facilities with information comparing environmental quality. Characteristics of the facility that may be monitored, compared and reported include natural light, indoor air quality, carbon dioxide levels, VOCs, acoustics, and thermal comfort. Promoting or optimizing environmental quality characteristics may be included in a game between occupants of different places. For example, the occupants of one building on a company campus may compete with occupants of other buildings to reduce carbon dioxide levels. Each building may be provided with sensors, instrumentation, and monitoring devices (for example, carbon dioxide sensors, acoustic meters) to supply data about conditions in the facilities.

In some embodiments, a score associated with ecological impact or environmental impact is determined for an entity, place, or both. The score may be a composite score based on multiple factors. For example, the system may compute an environmental score for occupants of a building that is based on a composite of values for each of air, water, gas, energy, light quality, or a combination of two or more such factors.

Figure 16:
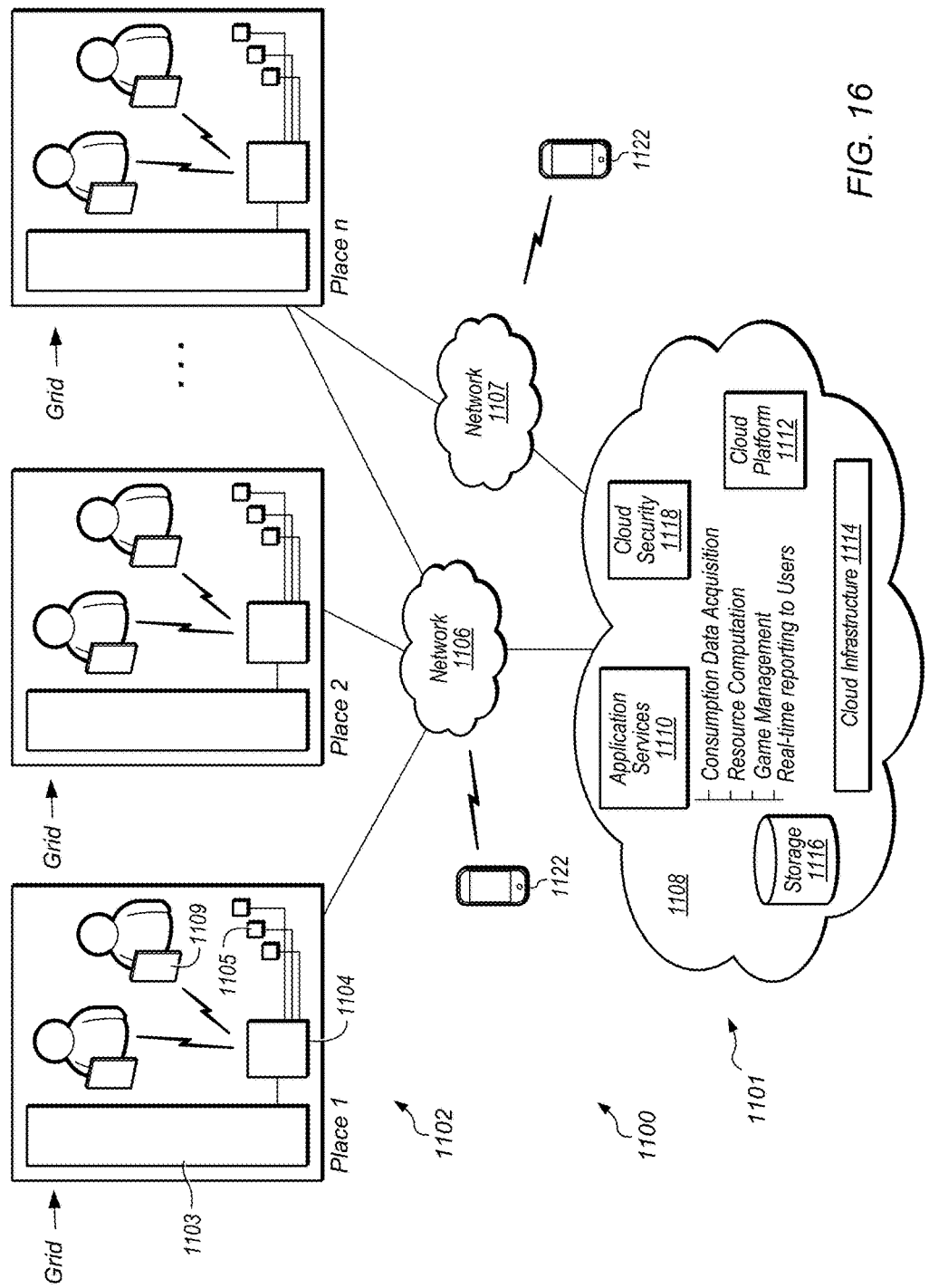
FIG. 16 illustrates one embodiment of a cloud computing system that can be implemented to carry out resource consumption monitoring and reporting.

In some embodiments, the system for promoting lower resource consumption or environmental objectives are provided by way of a cloud computing system over a communications network. FIG. 16 illustrates one embodiment of a cloud computing system that can be implemented to carry out resource consumption monitoring and reporting. System 1100 includes power consumption management system 1101 that provides power consumption monitoring and reporting for buildings 1102. Each of places 1102 includes load center 1103, data gathering and reporting server 1104, and building sensors 1105. Load center 1103 receives power from grid for various energy consuming systems and devices at place 1102. Some or all of the individual occupants at place 1102 may be able to view information on occupant display devices 1109.

Each of computing systems 1102 may be connected to cloud computing system 1108 by way of network 1107. In certain embodiments, occupant display devices 1109 are connected to one another by way of network 1106.

Cloud computing system 1108 may provide remote computing resources, remote storage resources, or both, for systems connected to cloud computing systems 1108. For example, cloud computing system 1108 may provide cloud computing services to users at places 1102. Occupant display devices 1109 may be, for example, workstations or mobile devices.

Various system architectures may be employed in cloud computing system 1108. Systems and components of cloud computing system 1108 may be at a single physical location, such as a data center, or distributed among any number of locations. Cloud computing system 1108 includes cloud application services 1110, cloud platform 1112, cloud infrastructure 1114, cloud data storage 1116, and cloud security 1118. Cloud applications services may be implemented by way of one or more computer systems, each include one or more central processing units, such as described herein. Examples of application services 1110 include providing power consumption monitoring, computation, recommendation engine, optimization, game management, and reporting. Cloud application services 1110 may access cloud data storage 1116.

Cloud infrastructure 1114 may encompass a variety of physical resources, such as computing devices, servers, block storage, mass storage devices, file servers, software, and network systems. In some embodiments, a cloud computing system encompasses virtualized resources, such as virtualized data storage or virtualized hardware.

In some embodiments, a service provider provides services to occupants of places 1102 by way of cloud computing resources. In some embodiments, computation resources are rented or leased to customers of the service provider. In certain embodiments, services are provided to users at sites as software as a service ("SaaS") or platform as a service ("Paas"). Services may be provided to each user on an on-demand basis.

Networks 1106 and 1107 may include any suitable data network or combination of networks that enable the exchange of information between electronic systems. For example, networks 1106 may include one or more Local Area Networks (LANs) such as Ethernet networks, as well as Wide Area Networks (WANs), Metropolitan Area Networks (MANs), or other data or telecommunication networks implemented over any suitable medium, such as electrical or optical cable, or via any suitable wireless standard such as IEEE 802.11 ("Wi-Fi"), IEEE 802.16 ("WiMax"), etc. In various embodiments, all or a portion of networks 1106 may include the network infrastructure commonly referred to as the Internet. In other embodiments, networks 1106 and 1107 may be entirely contained within an enterprise and not directly accessible from the Internet. In certain embodiments, information may be exchanged over a virtual private network. In one embodiment, information is exchanged over the internet, but encrypted in such a way to make a private network not accessible from the rest of the internet.

In various embodiments, some users may be connected over a different network than other users. For example, as shown in FIG. 16, users may be connected to cloud computing system 1108 over network 1107. In some embodiments, one or more users are connected over a private network. For example, in the embodiment shown in FIG. 16, network 1106 may be a public network and network 1107 may be a private network.

In various embodiments, a user may communicate over systems in system 1100 from locations external to users and cloud computing system 1108. For example, a decision maker may communicate with users at a remote location by way of portable electronic devices 1122. Portable electronic devices 1122 may be located anywhere, including at places 1102 or a remote location.

Although for illustrative purposes only three places are shown in FIG. 12, a system may include monitoring and reporting for number of places and any number of computer systems.

Computer systems may, in various embodiments, include components such as a CPU with an associated memory medium such as Compact Disc Read-Only Memory (CD-ROM). The memory medium may store program instructions for computer programs. The program instructions may be executable by the CPU. Computer systems may further include a display device such as monitor, an alphanumeric input device such as keyboard, and a directional input device such as mouse. Computer systems may be operable to execute the computer programs to implement computer-implemented systems and methods. A computer system may allow access to users by way of any browser or operating system.

Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of promoting more efficient use of a resource, comprising:
    measuring, using one or more sensors, values of consumption of a resource by an entity at a first place;
    acquiring, by a first computer system comprising a first processor at the first place, the values from the one or more sensors;
    transmitting, using the first processor at the first place, the acquired values to a second computer system comprising a second processor at a second place;
    automatically normalizing, using the second processor at the second place, at least one of the values, wherein normalization is based, at least in part, on a reference consumption structure determined for the first place based on measurements of past consumption;
    automatically generating, using the second processor at the second place, one or more comparisons based on at least one of the normalized values associated with consumption of the resource at the first place and the reference consumption structure determined for the first place based on measurements of past consumption; and
    transmitting, using the second processor at the second place, for display to at least one person associated with the entity, while the resource is being consumed at the first place by the entity, the one or more comparisons.

2. The method of claim 1, wherein at least one of the comparisons comprises a real-time display of consumption by the first entity.

3. The method of claim 1, wherein the resource is energy, wherein acquiring values associated with consumption of a resource at the first place comprises measuring energy consumption at the first place.

4. The method of claim 1, wherein the value corresponds to a rate of energy use for a period of time.

5. The method of claim 1, further comprising displaying, to at least one of the persons associated with the entity, while the resource is being consumed at the first place by the first entity, a graphical display showing resource consumption.

6. The method of claim 1, further comprising displaying, to at least one of the persons associated with the entity, while the resource is being consumed at the first place by the entity, a radial graphical display showing resource consumption at the first place over a period of time.

7. The method of claim 1, further comprising displaying, by the computer system, one or more recommendations about consumption of the resource to at least one person of the entity.

8. The method of claim 1, further comprising sending, by the computer system, one or more alert messages about consumption of the resource to at least one mobile device of a person associated with the entity, wherein at least one of the alert messages alerts the person about wasted resources.

9. The method of claim 1, further comprising:
    determining, by the computer system, based at least in part on the values acquired, one or more goals for more efficient consumption of the resource by the entity;
    displaying, to at least one person associated with the entity, while the resource is being consumed at the first place by the entity, at least one of the goals.

10. The method of claim 1, wherein the normalization adjusts for the number of occupants in the first place.

11. The method of claim 1, wherein the first place is at least a portion of a building, wherein the normalization adjusts for one or more weather conditions.

12. The method of claim 1, wherein the first place is at least a portion of a building, wherein the normalization adjusts for the age of construction of the building.

13. The method of claim 1, wherein comparing the at least one normalized value with one or more other values associated with consumption of the resource comprises comparing consumption at the first place at two or more different times.

14. The method of claim 1, wherein comparing the at least one normalized value with one or more other values associated with consumption of the resource comprises comparing current consumption by the entity with baseline consumption by the entity.

15. The method of claim 1, wherein comparison of at least one normalized value with one or more other values associated with consumption of the resource comprises comparing consumption by the first set of persons to consumption by another set of persons.

16. The method of claim 1, wherein comparison of at least one normalized value with one or more other values associated with consumption of the resource comprises displaying information about a game or contest between two or more persons to promote efficient use of the resource.

17. The method of claim 1, wherein comparison of at least one normalized value with one or more other values associated with consumption of the resource comprises comparing consumption by two or more different groups.

18. A system, comprising: a resource consumption management system, comprising:
    a consumption acquisition module
    a computation module;
    a processor; and a memory coupled to the processor and storing program instructions executable by the processor to implement:
    measuring, using one or more sensors, values of consumption of a resource by an entity at a first place;
    acquiring, by a first computer system comprising a first processor at the first place, the values from the one or more sensors;
    transmitting, using the first processor at the first place, the acquired values to a second computer system comprising a second processor at a second place;
    automatically normalizing, using the second processor at the second place, at least one of the values, wherein normalization is based, at least in part, on a reference consumption structure determined for the first place based on measurements of past consumption;
    automatically generating, using the second processor at the second place, one or more comparisons based on at least one of the normalized values associated with consumption of the resource at the first place and the reference consumption structure determined for the first place based on measurements of past consumption; and
    transmitting, using the second processor at the second place, for display to at least one person associated with the entity, while the resource is being consumed at the first place by the entity, the one or more comparisons.

19. A non-transitory tangible, computer readable medium comprising program instructions stored thereon, wherein the program instructions are computer-executable to implement:
    measuring, using one or more sensors, values of consumption of a resource by an entity at a first place;
    acquiring, by a first computer system comprising a first processor at the first place, the values from the one or more sensors;
    transmitting, using the first processor at the first place, the acquired values to a second computer system comprising a second processor at a second place;
    automatically normalizing, using the second processor at the second place, at least one of the values, wherein normalization is based, at least in part, on a reference consumption structure determined for the first place based on measurements of past consumption;
    automatically generating, using the second processor at the second place, one or more comparisons based on at least one of the normalized values associated with consumption of the resource at the first place and the reference consumption structure determined for the first place based on measurements of past consumption; and
    transmitting, using the second processor at the second place, for display to at least one person associated with the entity, while the resource is being consumed at the first place by the entity, the one or more comparisons.

\* \* \* \* \*